United States Patent
Saito et al.

(10) Patent No.: US 8,804,194 B2
(45) Date of Patent: Aug. 12, 2014

(54) IMAGE FORMING APPARATUS AND IMAGE FORMING METHOD

(71) Applicants: Kazuhiro Saito, Hachioji (JP); Hideaki Tanaka, Fussa (JP); Katsuyuki Hirata, Toyokawa (JP); Takashi Harashima, Sagamihara (JP)

(72) Inventors: Kazuhiro Saito, Hachioji (JP); Hideaki Tanaka, Fussa (JP); Katsuyuki Hirata, Toyokawa (JP); Takashi Harashima, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 13/846,178

(22) Filed: Mar. 18, 2013

(65) Prior Publication Data

US 2013/0258367 A1 Oct. 3, 2013

(30) Foreign Application Priority Data

Mar. 29, 2012 (JP) ................................. 2012-075822
Mar. 29, 2012 (JP) ................................. 2012-075824

(51) Int. Cl.
*G06K 1/00* (2006.01)
*H04N 1/60* (2006.01)

(52) U.S. Cl.
USPC ............ 358/1.9; 358/504; 358/518; 358/521; 358/523; 358/2.1; 399/82; 399/67; 399/69; 399/341

(58) Field of Classification Search
None
See application file for complete search history.

(56) References Cited

U.S. PATENT DOCUMENTS

| | | | |
|---|---|---|---|
| 2006/0115147 A1 | 6/2006 | Nishikawa | |
| 2008/0152390 A1 | 6/2008 | Akita | |
| 2010/0134811 A1* | 6/2010 | Fukasawa et al. | 358/1.9 |
| 2011/0110590 A1 | 5/2011 | Suzuki | |
| 2012/0107007 A1* | 5/2012 | Qiao et al. | 399/82 |

FOREIGN PATENT DOCUMENTS

| | | |
|---|---|---|
| JP | 09-200551 A | 7/1997 |
| JP | 2005-275250 A | 10/2005 |
| JP | 2006-150810 | 6/2006 |
| JP | 2007-183593 A | 7/2007 |
| JP | 2008-176316 | 7/2008 |
| JP | 2011-123473 | 6/2011 |
| JP | 2011-164555 | 8/2011 |
| JP | 2011-197331 | 10/2011 |

OTHER PUBLICATIONS

Japanese Office Action, Notification of Reason(s) for Refusal, Patent Application No. 2012-075824. Dispatch date: Apr. 22, 2014 (2 pages).

(Continued)

*Primary Examiner* — Quang N Vo
(74) *Attorney, Agent, or Firm* — Lucas & Mercanti, LLP

(57) ABSTRACT

An image forming apparatus includes an image forming unit, a storage unit, an image processing unit and a control unit. The image processing unit (i) calculates a summed height of a color toner image formed on a sheet by summing up a height of the color toner image on the basis of input image data, (ii) calculates, on the basis of a target value for glossiness stored in the storage unit, a target total height of the color toner image and a clear toner image to realize the target value for glossiness, and (iii) calculates a height of the clear toner image by subtracting the summed height from the target total height. On the basis of the calculated height of the clear toner image, the control unit adjusts the height of the clear toner image formed on the sheet.

17 Claims, 24 Drawing Sheets

(56) References Cited

OTHER PUBLICATIONS

English translation of Japanese Office Action, Notification of Reason(s) for Refusal, Patent Application No. 2012-075824. Dispatch date: Apr. 22, 2014 (3 pages).

Japanese Office Action, Notification of Reasons for Refusal, Patent Application No. 2012-075822. Dispatch date: Apr. 22, 2014 (4 pages).

English translation of Japanese Office Action, Notification of Reasons for Refusal, Patent Application No. 2012-075822. Dispatch date: Apr. 22, 2014 (6 pages).

* cited by examiner

GRADATION 0%

GRADATION 50%

GRADATION 100%

GLOSSINESS NOT CORRECTED

GLOSSINESS CORRECTED

DENSITY 0%

DENSITY 50%

DENSITY 100%

DENSITY 0%

DENSITY 50%

DENSITY 100%

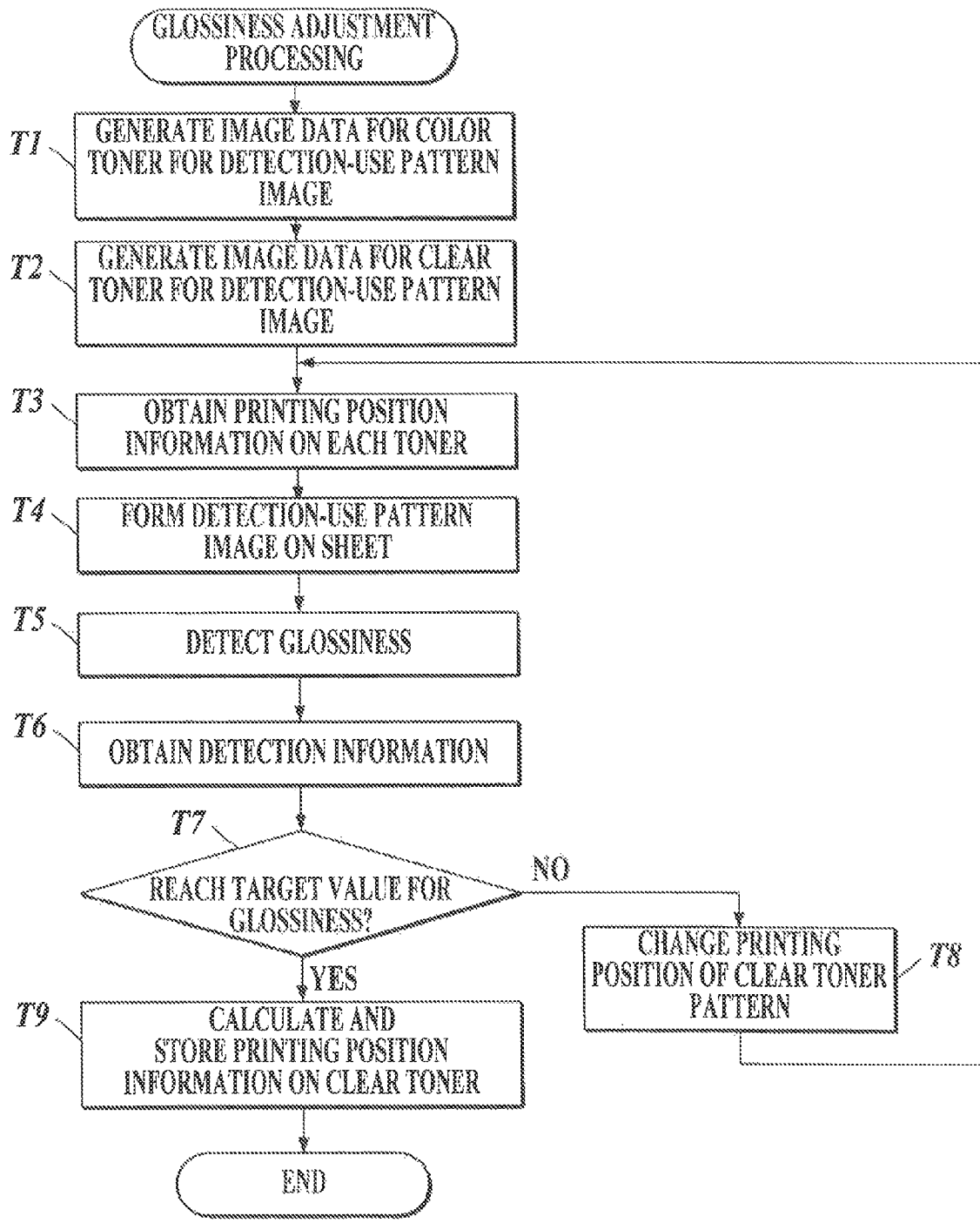

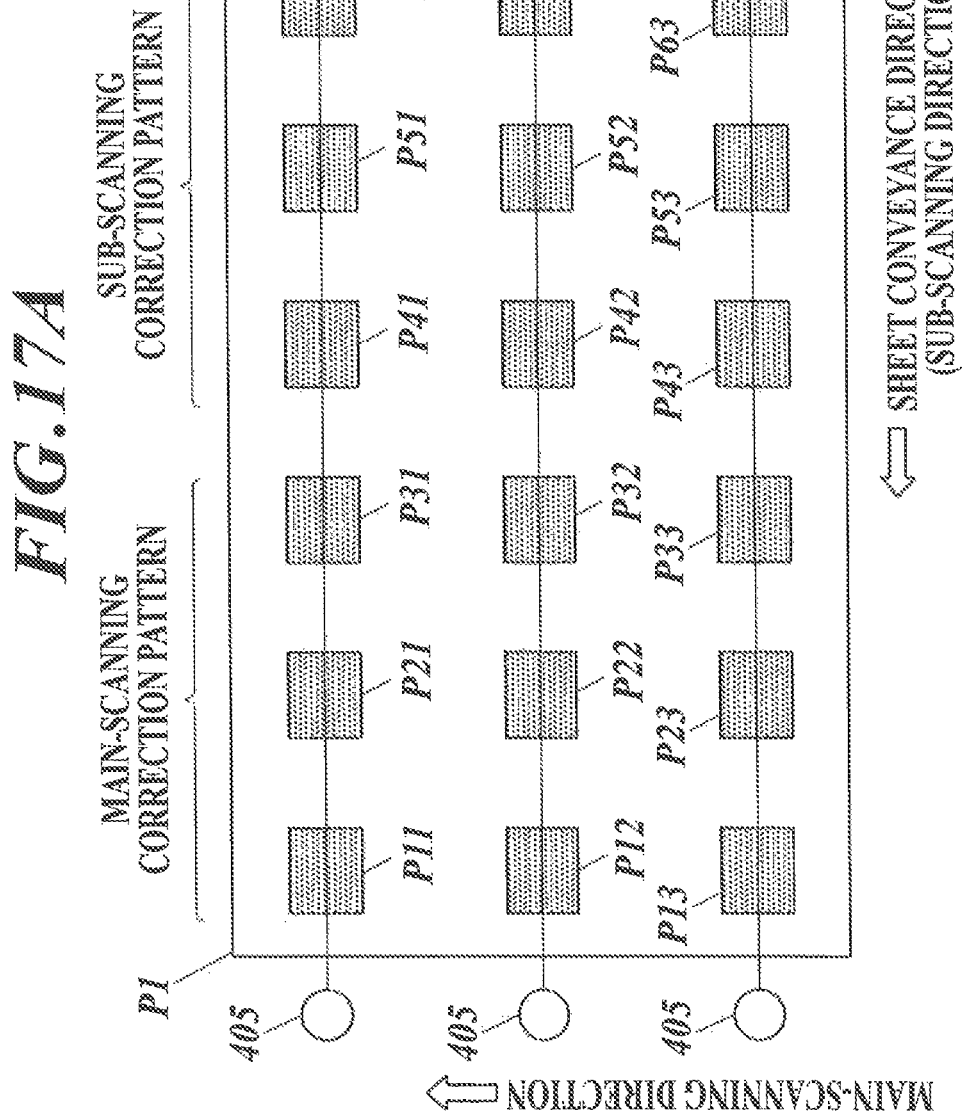

IMAGE FORMING APPARATUS AND IMAGE FORMING METHOD

BACKGROUND OF THE INVENTION

1. Field of the Invention

The present invention relates to an image forming apparatus and an image forming method.

2. Description of the Related Art

In general, an electrographic image forming apparatus irradiates (exposes) charged photosensitive drums with laser light based on image data so as to form electrostatic latent images thereon, and makes toners made of colored powders adhere to the electrostatic latent images so as to visualize the electrostatic latent images and accordingly form toner images on sheets of paper.

In an electrographic image forming apparatus, glossiness of images formed on sheets changes as a gradation level changes. This is because, in the electrographic system, gradations of color toner images, such as Y (yellow) toner images, M (magenta) toner images, C (cyan) toner images and K (black) toner images, are expressed by area coverage modulation (screens or halftone dots), and accordingly roughness exists on the surfaces of images (image surface) microscopically, and the roughness on the image surfaces changes as the gradation level changes.

In recent years, there has been proposed an image forming apparatus which uses a clear toner in addition to color toners so as to increase glossiness of images.

However, on a sheet on which color toner images (or a color toner image) are formed, as described above, roughness exists on the image surface because of the amounts of toners adhering to the sheet (toner adhesion amount) different depending on input image data (density gradation data), the amounts of toners adhering to the sheet different depending on colors (Y, M, C and K) for the same gradation, or the like. Hence, if a clear toner is made to adhere onto such a sheet uniformly, gloss unevenness is generated. The gloss is detected from specular reflection light reflected from the image surface on the sheet. Therefore, in order to remove or reduce the gloss unevenness, it is important to increase smoothness of the image surface on a sheet.

Then, for example, there is disclosed in Japanese Patent Application Laid-Open Publication No. hei 9-200551 (Patent Document 1) a digital color copying apparatus which forms a clear toner image on the basis of an inversion signal of an input image signal so as to correct the gloss unevenness.

Further, there is disclosed in Japanese Patent Application Laid-Open Publication No. 2005-275250 (Patent Document 2) an image forming apparatus provided with a glossiness sensor to detect glossiness on a recording sheet after fixing, the image forming apparatus which obtains a clear toner development-glossiness characteristic, and determines a development contrast to attain target glossiness.

Further, there is disclosed in Japanese Patent Application Laid-Open Publication No. 2007-183593 (Patent Document 3) an image forming apparatus provided with a glossiness sensor to detect glossiness on a recording sheet after fixing, the image forming apparatus which detects glossiness of each gradation using a clear toner and color (Y, M, C and K) toners, and controls the amount of the clear toner per unit area on the recording sheet in such a way that, with respect to each of Y, M, C and K, the glossiness is uniform at the highest glossiness among glossiness of gradations of 0 to 255. In the image forming apparatus disclosed in Patent Document 3, the control of the amount of the clear toner is performed by changing a gradation level.

However, the toner adhesion amount of a color image depends on a gradation-toner adhesion amount characteristic of each of Y, M, C and K. Hence, the total toner adhesion amount of the color toners and the clear toner on a sheet corrected by the clear toner on the basis of the inversion signal of the input image signal is not uniform, so that the technology disclosed in Patent Document 1 cannot solve the gloss difference (gloss unevenness). In addition, even when the total toner adhesion amount corrected by the clear toner is uniform, if the total height of the color toner images and the clear toner image is not uniform, roughness is produced on the image surface, and accordingly the gloss difference is generated. For example, even if the toner adhesion amounts of Y, M, C and K are the same, the heights of Y, M, C and K toner images (toner image height) are different from each other because of the different specific gravity of Y, M, C and K toners.

Further, although the technology disclosed in Patent Document 2 can reduce the gloss difference between an image portion and a non-image portion, the technology cannot reduce the gloss unevenness in the image portion because the clear toner is developed uniformly on an image.

Further, although the technology disclosed in Patent Document 3 can make the glossiness uniform in an image portion of each of Y, M, C and K regardless of gradations, the technology generates the gloss/density unevenness among Y, M, C and K. In addition, as the number of colors (Y, M, C and K) laid on top of each other increases, namely, from a primary color to a secondary color, a tertiary color and then a quartic color, the gloss difference increases, and accordingly the roughness on the surface of the recording sheet becomes noticeable. The technology disclosed in Patent Document 3 has the following problems (1) to (3) too.

(1) In a case where the amount of the clear toner is changed only by changing the gradation level without area coverage modulation (without screening), the number of levels to change the toner adhesion amount by processing decreases, and also the clear toner image is uniformly formed all over the screens (halftone dots) of the color toner images. Accordingly, the image surface of the color toner images on which the clear toner image is formed (the image surface of the color toner images plus the clear toner image) is not always smooth. In order to make the image surface smooth, it is necessary to increase the amount of the clear toner. Accordingly, the consumption of the clear toner increases.

(2) In a case where the amount of the clear toner is changed with area coverage modulation (with screening), the number of levels to change the toner adhesion amount increases, but the halftone dots of the clear toner image are laid on the halftone dots of the color toner images. Accordingly, the image surface is not smooth. In addition, when color shift (shifts in printing positions of toners) occurs, the roughness on the image surface of the color toner images plus the clear toner image changes. Accordingly, images cannot be stably outputted.

(3) In the case where the amount of the clear toner is changed with area coverage modulation (with screening), which is described in (2), an improvement can be made with respect to the printing positions of the color toner images and the clear toner image by normal resist control. However, the resist control is performed on photosensitive drums or a transfer belt. Accordingly, when images are formed on sheets, the printing positions may be shifted thereon by a load or the like for sheet conveyance onto the transfer unit or the like.

As a result, the technology disclosed in Patent Document 3 has a problem that if a clear toner image is formed on color toner images, a large amount of a clear toner is consumed, or desired gloss cannot be made because of the color shift.

BRIEF SUMMARY OF THE INVENTION

Objects of the present invention include providing an image having uniform glossiness regardless of input image data with an image forming apparatus, and providing an image having stable glossiness with no gloss unevenness without consuming a large amount of a clear toner with an image forming apparatus.

In order to achieve at least one of the objects, according to a first aspect of the present invention, there is provided an image forming apparatus including: an image forming unit which forms an image constituted of a color toner image and a clear toner image on a sheet, the image forming unit including: a color image forming unit which uses a color toner to form the color toner image; and a clear image forming unit which uses a clear toner to form the clear toner image; a storage unit which stores a predetermined target value for glossiness; an image processing unit which (i) calculates a summed height of the color toner image formed on the sheet by summing up a height of the color toner image on the basis of input image data, (ii) calculates, on the basis of the target value for glossiness stored in the storage unit, a target total height of the color toner image and the clear toner image to realize the target value for glossiness, and (iii) calculates a height of the clear toner image by subtracting the summed height of the color toner image from the target total height of the color toner image and the clear toner image; and a control unit which adjusts, on the basis of the calculated height of the clear toner image, the height of the clear toner image formed on the sheet by the image forming unit.

Preferably, in the image forming apparatus, the image processing unit calculates the height of the clear toner image for each pixel, and the control unit adjusts, on the basis of the height of the clear toner image calculated for each pixel, the height of the clear toner image for each pixel, the clear toner image which is formed on the sheet by the image forming unit.

Preferably, in the image forming apparatus, the target value for glossiness is highest glossiness achievable by the image forming unit.

Preferably, the image forming apparatus further includes an operation unit with which a user adjusts the target value for glossiness.

Preferably, in the image forming apparatus, the target value for glossiness is highest glossiness achievable by the image forming unit in a highest order color of the input image data.

Preferably, the image forming apparatus according to claim 4 further includes a setting unit with which highest glossiness achievable by the image forming unit, the target value adjusted by the user with the operation unit or highest glossiness achievable by the image forming unit in a highest order color of the input image data is set as the target value for glossiness, and the storage unit stores the set target value for glossiness.

In order to achieve at least one of the objects, according to a second aspect of the present invention, there is provided an image forming apparatus including: an image forming unit which forms an image constituted of a color toner image and a clear toner image on a sheet, the image forming unit including: a color image forming unit which uses a color toner to form the color toner image; and a clear image forming unit which uses a clear toner to form the clear toner image; a glossiness detection unit which detects glossiness of the image formed on the sheet; a glossiness adjustment unit which (i) generates image data for a detection-use pattern image including a color toner pattern and a clear toner pattern in such a way that a total toner adhesion amount of the color toner and the clear toner obtained by summing up a toner adhesion amount of the color toner and a toner adhesion amount of the clear toner makes a predetermined target value for glossiness so as to make the glossiness in all pixels uniform, (ii) makes the image forming unit form the detection-use pattern image by shifting a forming position of the clear toner pattern with respect to a forming position of the color toner pattern stepwise on the basis of the image data for the detection-use pattern image, (iii) makes the glossiness detection unit detect the glossiness of the detection-use pattern image, and (iv) obtains, on the basis of the forming position of the clear toner pattern when the glossiness detected by the glossiness detection unit reaches the target value for glossiness, forming position information on a forming position of the clear toner image with respect to a forming position of the color toner image; and a control unit which (i) generates image data for the clear toner on the basis of input image data in such a way that the total toner adhesion amount of the color toner and the clear toner makes the target value for glossiness so as to make the glossiness in all pixels uniform, and (ii) when the image forming unit forms the image on the sheet on the basis of the input image data and the image data for the clear toner, controls the forming position of the clear toner image with respect to the forming position of the color toner image on the basis of the forming position information obtained by the glossiness adjustment unit.

Preferably, in the image forming apparatus, the control unit (i) calculates, for each pixel, a summed toner adhesion amount of the color toner by summing up the toner adhesion amount of the color toner on the basis of the input image data, (ii) calculates, for each pixel, the toner adhesion amount of the clear toner by subtracting the summed toner adhesion amount of the color toner from a target total toner adhesion amount of the color toner and the clear toner corresponding to the target value for glossiness, and (iii) generates the image data for the clear toner on the basis of the toner adhesion amount of the clear toner calculated for each pixel.

Preferably, in the image forming apparatus, the target value for glossiness is highest glossiness achievable by the image forming unit.

Preferably, the image forming apparatus further includes an operation unit with which a user adjusts the target value for glossiness.

Preferably, in the image forming apparatus, the target value for glossiness is highest glossiness achievable by the image forming unit in a highest order color of the input image data.

BRIEF DESCRIPTION OF THE SEVERAL VIEWS OF THE DRAWING

The present invention is fully understood from the detailed description given hereinafter and the accompanying drawings, which are given by way of illustration only, and thus are not intended to limit the present invention, wherein:

FIG. 16 is a flowchart of glossiness adjustment processing performed by a control unit shown in FIG. 1;

FIGS. 17A and 17B show an example of color toner patterns of a detection-use pattern image;

DETAILED DESCRIPTION OF THE INVENTION

First Embodiment

In the following, an image forming apparatus in accordance with a first embodiment of the present invention is described with reference to the drawings.

[Configuration of Image Forming Apparatus 1]

Figure 1:
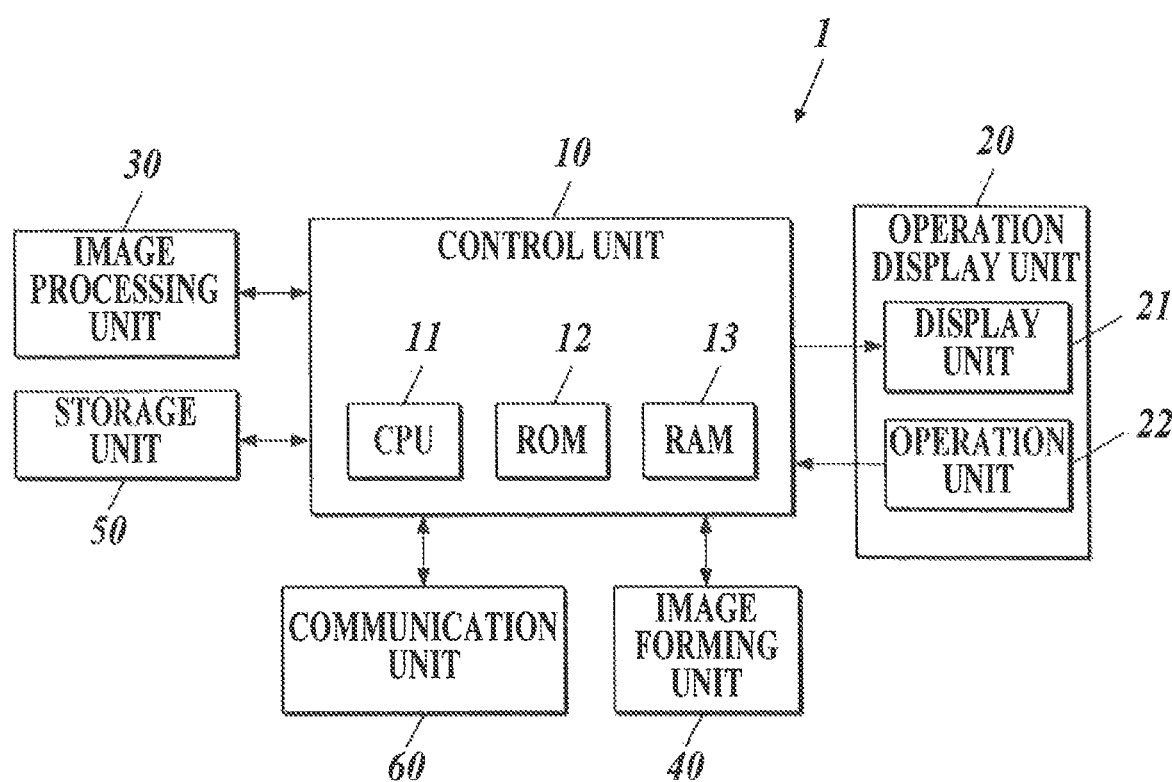
FIG. 1 is a block diagram showing a functional configuration of an image forming apparatus.

FIG. 1 is a block diagram showing a functional configuration of an image forming apparatus 1. The image forming apparatus 1 is a color image forming apparatus using electrophotographic process technology.

As shown in FIG. 1, the image forming apparatus 1 includes a control unit 10, an operation display unit 20, an image processing unit 30, an image forming unit 40, a storage unit 50 and a communication unit 60. These units are connected to each other via a not-shown bus.

The control unit 10 includes a CPU (Central Processing Unit) 11, a ROM (Read Only Memory) 12 and a RAM (Random Access Memory) 13. The CPU 11 of the control unit 10 reads a system program and various processing programs stored in the ROM 12 so as to load the read programs to the RAM 13, and performs centralized control on operations of the units and the like of the image forming apparatus 1 in accordance with the loaded programs.

The operation display unit 20 includes a display unit 21 and an operation unit 22.

The display unit 21 includes an LCD (Liquid Crystal Display), and displays various operation buttons, states of the image forming apparatus 1, operation states of various functions and the like on a display screen in response to display signals inputted from the control unit 10.

The operation unit 22 includes various keys, such as numeric keys and a start key, and receives user's key operations and outputs operation signals corresponding to the key operations to the control unit 10. The operation unit 22 also includes a resistive touch panel, in which transparent electrodes are arranged in a lattice, covering the upper face of the LCD of the display unit 21. X and Y coordinates of points which are pressed by a finger, a touch pen or the like are detected as voltage values, and position signals corresponding to the detected voltage values are outputted as the operation signals to the control unit 10. The touch panel is not limited to the resistive touch panel, and hence may be a capacitive touch panel, an optical touch panel or the like.

The image processing unit 30 performs image processing, such as shading correction, color conversion, gradation correction, gradation reproduction processing (screening, error diffusion or the like) or glossiness correction processing, on input image data (density gradation data) inputted thereto via the communication unit 60 or the like, and outputs the image data to the image forming unit 40.

The image forming unit 40 performs image formation on sheets of paper by the electrophotographic system on the basis of the image data inputted from the image processing unit 30 or the control unit 10. In the embodiment, the image forming unit 40 includes four color image forming units which respectively use yellow, magenta, cyan and black toners, so as to perform image formation. The image forming unit 40 also includes a clear image forming unit which uses a clear toner so as to perform image formation. The clear toner is a toner to adjust glossiness of images, and contains a binder resin at least. It is preferable that the clear toner be colorless and clear (transparent). However, the clear toner may include a toner, the clearness of which is a little low, depending on components contained in the toner.

Figure 2:
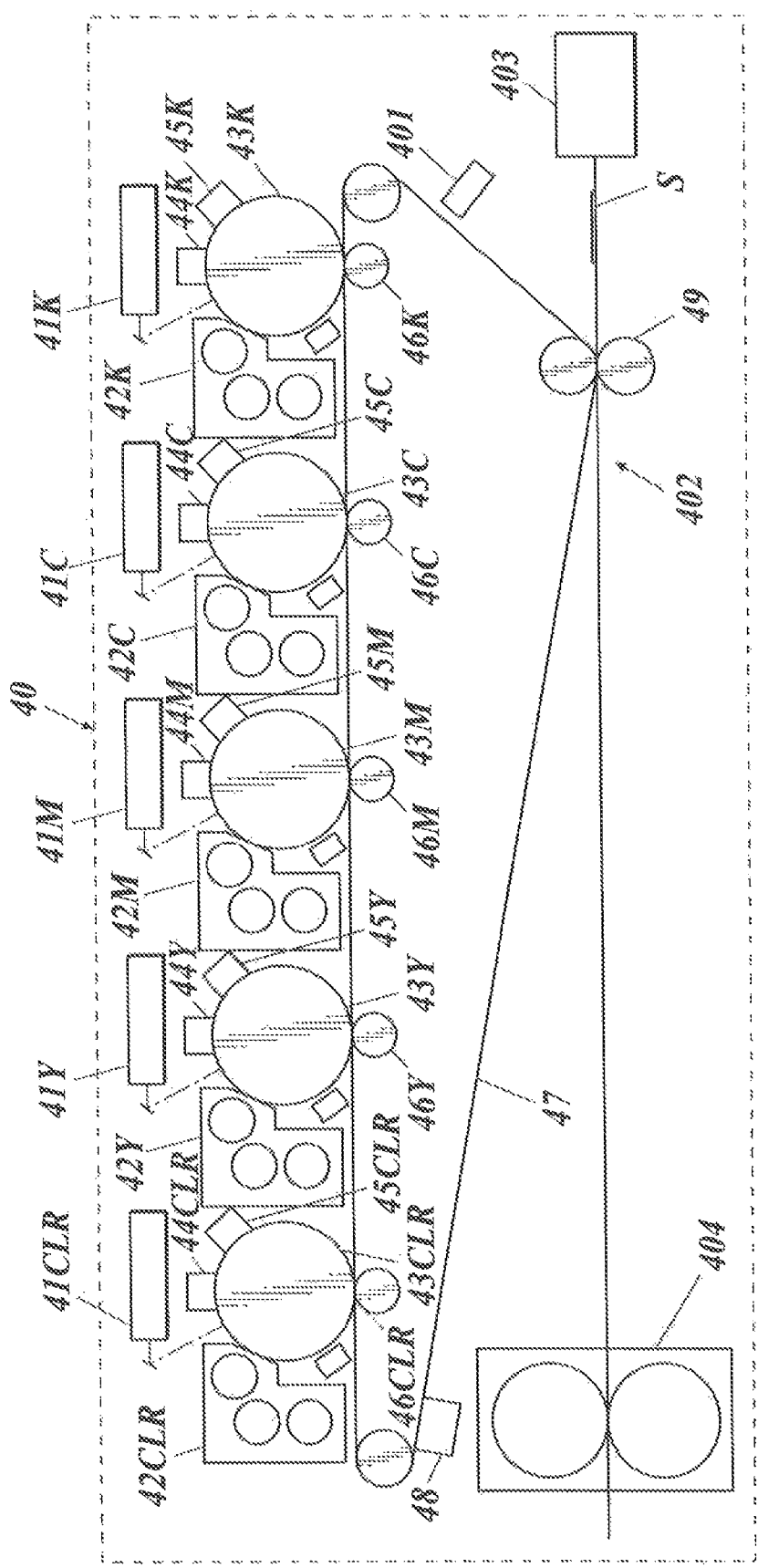
FIG. 2 schematically shows an example of a confutation of an image forming unit in accordance with a first embodiment of the present invention.

FIG. 2 schematically shows a configuration of the image forming unit 40.

As shown in FIG. 2, the image forming unit 40 includes exposure units 41CLR, 41Y, 41M, 41C and 41K, developer units 42CLR, 42Y, 42M, 42C and 42K, photosensitive drums 43CLR, 43Y, 43M, 43C and 43K, charger units 44CLR, 44Y, 44M, 44C and 44K, cleaner units 45CLR, 45Y, 45M, 45C and 45K, primary transfer rollers 46CLR, 46Y, 46M, 46C and 46K as transfer members, an intermediate transfer belt 47 as an intermediate transfer body, a cleaner unit 48, a secondary transfer roller 49, a density detection sensor 401, a conveyance unit 402, a paper feeder unit 403 and a fixing unit 404. The "CLR", "Y", "M", "C" and "K" following the reference numbers of the units and the like represent colors (and a no-color) of toners used in the units and the like, namely, clear, yellow, magenta, cyan and black, respectively.

Each of the exposure units 41CLR, 41Y, 41M, 41C and 41K includes a laser light source, such as an LD (Laser Diode), a polygon mirror and a plurality of lenses. The exposure units 41CLR, 41Y, 41M, 41C and 41K scan and expose the surfaces of the photosensitive drums 43CLR, 43Y, 43M, 43C and 43K with laser beams, respectively, on the basis of the image data sent from the image processing unit 30 or the control unit 10. By the exposure and scan with the laser beams, latent images are formed on the photosensitive drums 43CLR, 43Y, 43M, 43C and 43K charged by the charger units 44CLR, 44Y, 44M, 44C and 44K, respectively.

The latent images formed on the photosensitive drums 43CLR, 43Y, 43M, 43C and 43K are developed with the toners of the developer units 42CLR, 42Y, 42M, 42C and 42K adhering thereto, respectively. Consequently, clear, yellow, magenta, cyan and black toner images are formed on the photosensitive drums 43CLR, 43Y, 43M, 43C and 43K, respectively.

The toner images formed on and held by the photosensitive drums 43CLR, 43Y, 43M, 43C and 43K are successively transferred to predetermined points on the intermediate transfer belt 47 by the primary transfer rollers 46CLR, 46Y, 46M, 46C and 46K, respectively, to which a predetermined voltage is applied from a not-shown power source, whereby a primary transfer is performed. The remaining toners on the surfaces of the photosensitive drums 43CLR, 43Y, 43M, 43C and 43K, which finish transferring the toner images to the intermediate transfer belt 47, are removed by the cleaner units 45CLR, 45Y, 45M, 45C and 45K, respectively.

The intermediate transfer belt 47 is a semiconductive endless belt hanging around and held by a plurality of rollers so as to rotate. The intermediate transfer belt 47 rotates as the rollers rotate.

The intermediate transfer belt 47 is pressed to the photosensitive drums 43CLR, 43Y, 43M, 43C and 43K by the primary transfer rollers 46CLR, 46Y, 46M, 46C and 46K, which face the photosensitive drums 43CLR, 43Y, 43M, 43C and 43K, respectively. A transfer current, which corresponds to the voltage applied to the primary transfer rollers 46CLR, 46Y, 46M, 46C and 46K, flows through the primary transfer rollers 46CLR, 46Y, 46M, 46C and 46K. Consequently, the toner images developed on the surfaces of the photosensitive drums 43CLR, 43Y, 43M, 43C and 43K are successively transferred (primary transfer) to the intermediate transfer belt 47 by the primary transfer rollers 46CLR, 46Y, 46M, 46C and 46K, respectively.

When a sheet ("S" in FIG. 2) of paper, the type of which is specified by the control unit 10, is fed from the paper feeder unit 403, the fed sheet is carried by the conveyance unit 402 to a transfer point where secondary transfer is performed by the secondary transfer roller 49. The toner images of a color image are transferred (secondary transfer) to the sheet by the secondary transfer roller 49. After the secondary transfer, the sheet is carried to the fixing unit 404 so that the toner images (the color image), which are transferred to the sheet, are fixed by heat. The remaining toners on the intermediate transfer belt 47 are removed by the cleaner unit 48.

The density detection sensor 401 is a sensor used to perform resist control, gradation correction and the like. The density detection sensor 401 is disposed in such a way as to face the intermediate transfer belt 47, and detects the toner images, which are formed on the intermediate transfer belt 47, so as to output the detection result to the control unit 10. As the density detection sensor 401, for example, a specular reflective sensor can be used. The specular reflective sensor includes a light emitter, such as an LED (Light Emitting Diode), and a light receiver, such as a photodiode, and detects reflection densities of toner patterns.

The storage unit 50 is constituted of a nonvolatile semiconductor memory, an HDD (Hard Disc Drive) or the like, and stores the system program executable by the image forming apparatus 1, the processing programs executable by the system program, data used to execute the processing programs, data of processing results obtained by arithmetic processing performed by the control unit 10 and the like.

For example, the storage unit 50 stores target glossiness (a target value for glossiness), information on specific gravity of clear (CLR), Y, M, C and K toners, toner adhesion amount (the maximum toner adhesion amount per pixel) settings for CLR, Y, M, C and K toners, a glossiness-toner image height table which shows a relationship between glossiness and the total height of toner images, printing position information on CLR, Y, M, C and K toner images as forming position information. The printing position information is obtained by the resist control, and the like.

The communication unit 60 includes a modem, a LAN adapter and a router. The communication unit 60 controls communications with an external apparatus, such as a PC (Personal Computer), connected to a communication network, such as a LAN (Local Area Network) or a WAN (Wide Area Network), so as to receive image data and the like from the external apparatus, for example.

[Change of Glossiness in Electrophotographic System]

Change of glossiness (gloss unevenness) on the surface of an image (image surface) formed on a sheet by the electrophotographic system is described.

As described above, the image forming apparatus 1 of the embodiment performs screening, error diffusion or the like so as to perform gradation reproduction by area coverage modulation. However, the area coverage modulation has a problem that the glossiness changes depending on a gradation level because the toner adhesion amount and the toner image height on a sheet changes depending on the gradation level. (Refer to FIG. 3.)

The more the toner adhesion amount is (the higher the toner image height is), the less the amount of light penetrating the toner is and the more the amount of light regularly (specularly) reflected (specular reflection light) by the toner is, and accordingly the higher the glossiness is.

Figure 3:
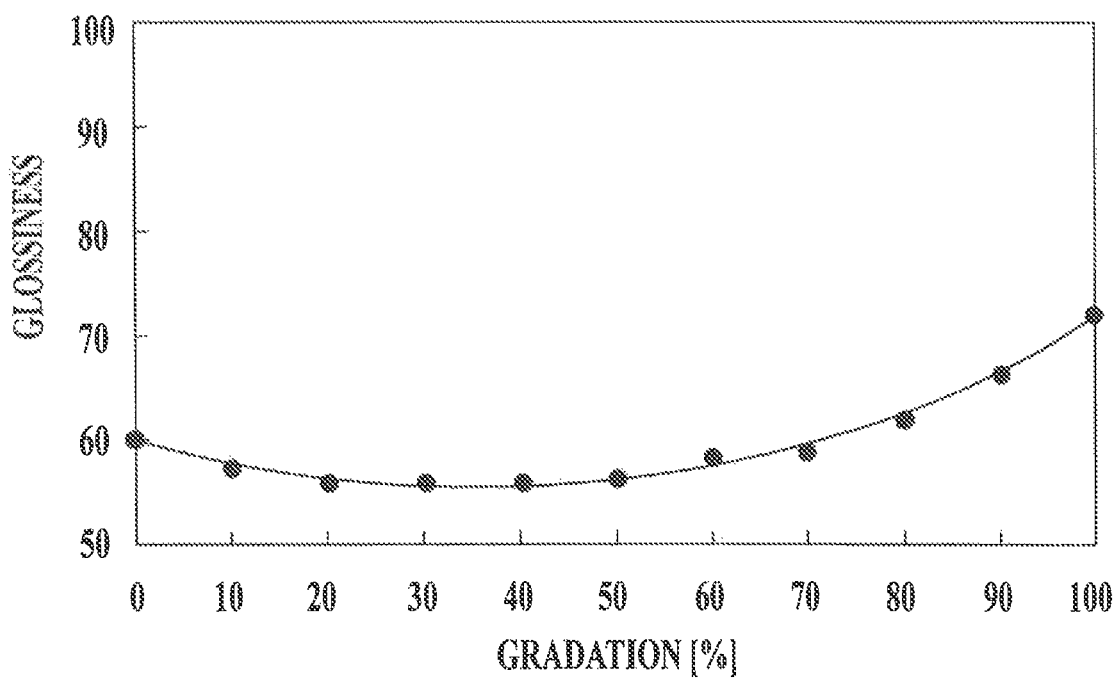
FIG. 3 is a graph showing a relationship (gradation-glossiness characteristic) between a gradation (density) level (%) and glossiness about a primary color.
Figure 4A:
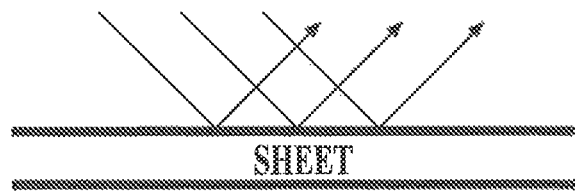
FIGS. 4A, 4B and 4C show sections of output images having gradations of 0%, 50% and 100%, respectively.
Figure 4B:
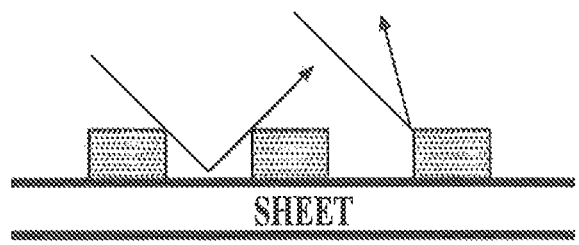
Figure 4C:
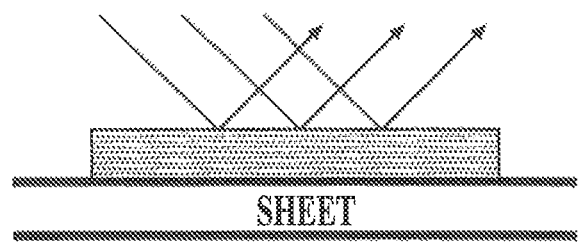

FIG. 3 is a graph showing a relationship (gradation-glossiness characteristic) between the gradation (density) level (%) and the glossiness about a primary color (one of Y, M, C and K). FIGS. 4A to 4C show sections of primary color images having gradations of 0%, 50% and 100%, respectively.

As shown in FIG. 4A, in the case of a gradation of 0%, there is no toner at all on a sheet. Hence, the glossiness at a gradation of 0% depends on the surface nature of a sheet. The surface of a sheet is relatively smooth. Hence, as shown in FIG. 3, the glossiness at a gradation of 0% is a relatively high value.

When the gradation level increases, a gradation is expressed by area coverage modulation (halftone dots). Hence, as shown in FIG. 4B, roughness is produced by the toner on a sheet. Because of the roughness, the specular reflection light decreases, and diffused reflection light increases. Hence, as shown in FIG. 3, the glossiness decreases. The glossiness at a gradation of around 50% is the lowest.

After that, the higher the gradation level is, the more the toner adhesion amount occupying the surface of a sheet is, and the smoother the image surface is gradually. In the case of a gradation of 100%, as shown in FIG. 4C, the toner is uniformly disposed on a sheet with a predetermined amount (predetermined height). Because the surface of a toner image (image surface) having a uniform height at points (pixels) is relatively smooth, as shown in FIG. 3, the glossiness is a high value again.

Thus, in the case of the primary color, the glossiness changes depending on the gradation level.

In the case of a no-primary color, namely, a secondary color, a tertiary color or a quartic color, the following problems arise too.

Figure 5:
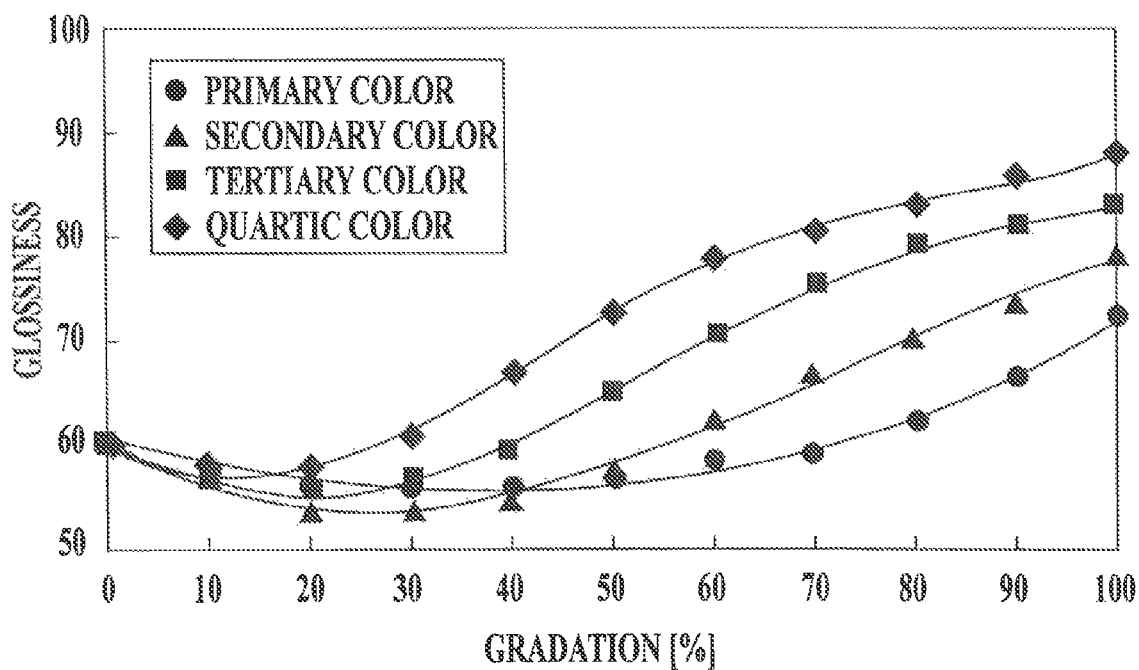
FIG. 5 is a graph showing a relationship (gradation-glossiness characteristic) between a gradation (density) level (%) and glossiness about order colors (the primary color, a secondary color, a tertiary color and a quartic color)

The gradation-glossiness characteristic is different among Y, M, C and K. The toner specific gravity is different among Y, M, C and K, so that even with the same toner adhesion amount, the toner image height is different among Y, M, C and K. Therefore, even with the same gradation (gradation level) or toner adhesion amount, the glossiness is not uniform among Y, M, C and K. Further, the secondary color, the tertiary color and the quartic color are made of Y, M, C and/or K being laid on top of each other, so that the toner image height (total height of toner images) increases in the order named, namely, from the secondary color to the tertiary color, and then the quartic color. Therefore, as shown in FIG. 5, even with the same gradation, the glossiness is not uniform among the primary color, the secondary color, the tertiary color and the quartic color.

[Operation of Image Forming Apparatus 1]

In the image forming apparatus 1, the glossiness correction processing described below is performed regardless of the gradation level, the colors (C, M, Y and K) and the order colors (the primary color, the secondary color, the tertiary color and the quartic color) of the input image data so as to make the glossiness of the image surface on a sheet uniform.

It is preferable that, in the image forming apparatus 1, the control unit 10 control the units and the like of the image forming unit 40 so as to perform image stabilization control and the resist control before the glossiness correction processing.

The image stabilization control is control to stably provide high image quality by dealing with change of environmental factors, such as temperature and humidity in the image forming apparatus 1, and replacement of developing solutions. As the image stabilization control, for example, highest density adjustment (development DC bias adjustment), correction to make electric potentials on the surfaces of photosensitive drums uniform (grid voltage adjustment), line width correction (maximum laser power adjustment) or halftone density correction (γ correction) is performed.

The resist control is control to detect the shifted amounts of printing positions as forming positions of the toner images on the intermediate transfer belt 47 so as to correct the shifts of the printing positions (misalignment of positions where pixels of CLR, Y, M, C and K image data are printed, the pixels corresponding to each other; called "color shift") caused by the image forming units, which respectively use the CLR, Y, M, C and K toners. For example, a pattern (pattern image) constituted of an oblique line or a horizontal line is formed on each of the photosensitive drums 43CLR, 43Y, 43M, 43C and 43K, the CLR, Y, M, C and K pattern images are transferred onto the intermediate transfer belt 47, which is moving, side by side, and positions of the CLR, Y, M, C and K pattern images are detected by the density detection sensor 401 and stored in the storage unit 50 as the printing position information on the CLR, Y, M, C and K toner images. When image formation is performed, exposure timings for the photosensitive drums 43CLR, 43Y, 43M, 43C and 43K and a moving speed (rotating speed) of the intermediate transfer belt 47 are controlled by the resist control on the basis of the printing position information stored in the storage unit 50, so that the shifts of the printing positions are connected.

In the following, the glossiness correction processing is described.

Figure 6:
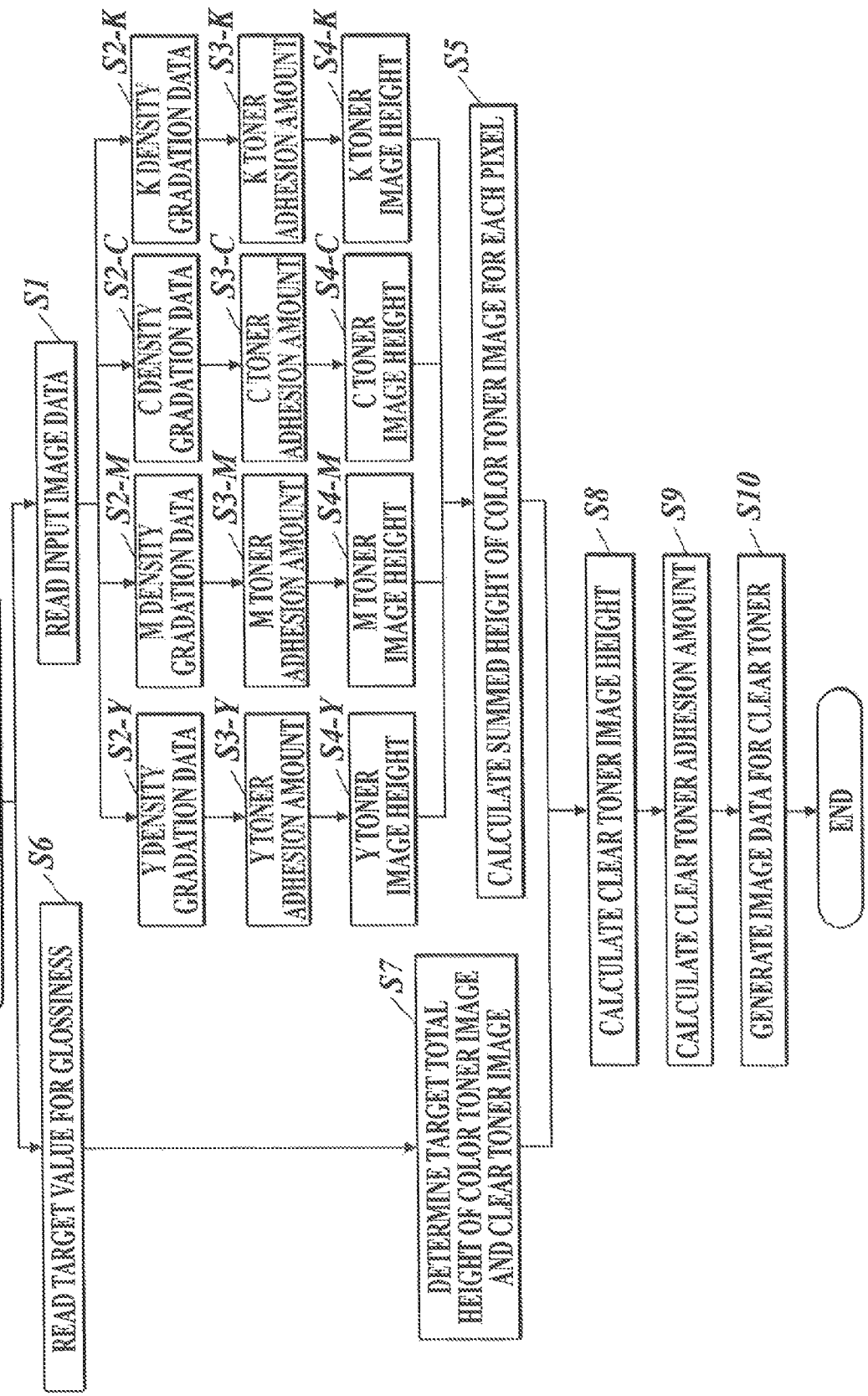
FIG. 6 is a flowchart of glossiness correction processing.

FIG. 6 shows a flowchart of the glossiness correction processing. The glossiness correction processing is performed by the image processing unit 30 under the control of the control unit 10.

First, the input image data as a target for the glossiness correction processing is read (Step S1), and then the input image data is divided into Y, M, C and K image data (density gradation data) (Steps S2-Y, S2-M, S2-C and S2-K).

Figure 7A:
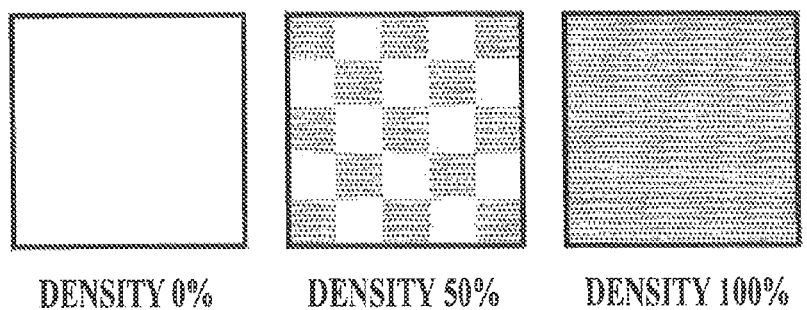
FIGS. 7A and 7B are illustrations to explain area coverage modulation.
Figure 7B:
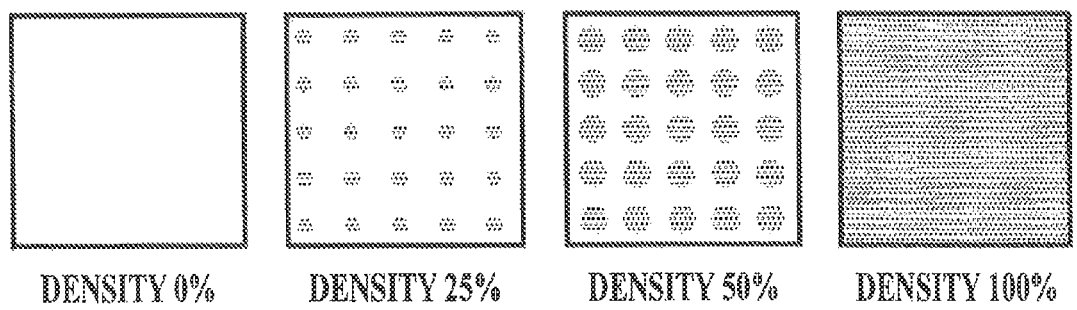

Next, screening or the like is performed on the Y, M, C and K image data (density gradation data) so as to disclose the toner adhesion amounts of Y, M, C and K toners on a pixel to pixel basis (Steps S3-Y, S3-M, S3-C and S3-K). The screening is, for example, processing to convert the density gradation data into image data (area coverage modulation data), which shows whether toner be made to adhere to each pixel or not (1 or 0) as shown in FIG. 7A. Alternatively, the screening may be processing to convert the density gradation data into image data (area coverage modulation data), which shows the size (0 to 1) of a dot of each pixel as shown in FIG. 7B. Alternatively, the screening may be hybrid screening which is a combination of the screening shown in FIG. 7A and the screening shown in FIG. 7B. The toner adhesion amount of each color (Y, M, C or K) toner for each pixel is calculated by multiplying the image data constituted of the pixels, on which screening has been performed, by the toner adhesion amount setting for the color stored in the storage unit 50.

Next, with respect to each color, the information on the toner specific gravity stored in the storage unit 50 is read, and the toner image height is calculated for each pixel on the basis of the toner adhesion amount and the information on the toner specific gravity (Steps S4-Y, S4-M, S4-C and S4-K). For example, by using a predetermined mathematical relation of the toner image height being proportional to the toner adhesion amount, and inversely proportional to the toner specific gravity, the toner image height is calculated.

Then, for each pixel, the summed height of the color toner images (Y toner image height+M toner image height+C toner image height+K toner image height) is calculated (Step S5), and the processing is moved to Step S8.

Figure 8:
FIG. 8 shows a glossiness-toner image height table by a graph.

Meanwhile, the target value for glossiness is read from the storage unit 50 (Step S6), a target total height of the toner images (Y toner image height+M toner image height+C toner image height+K toner image height+CLR toner image height) to realize the total value for glossiness is calculated by using the glossiness-toner image height table showing the relationship between the glossiness and the total height of the toner images (Step S7), and the processing is moved to Step S8. FIG. 8 shows an example of the glossiness-toner image height table by a graph.

Here, the target value for glossiness is the highest glossiness achievable by the image forming apparatus 1. If the toner adhesion amount is too much, the toner image cannot be fixed well on a sheet, and the sheet is winded around a roller of the fixing unit 404 and accordingly a jam occurs, and/or the toner is peeled off from the sheet, on which image formation has been performed, when the sheet is folded. Hence, in general, an image forming apparatus is provided with a limit for the toner adhesion amount (toner adhesion amount limit) in terms of the limits of a fixing characteristic thereof. The highest glossiness achievable by the image forming apparatus 1 is the glossiness achieved when the maximum toner adhesion amount within the toner adhesion amount limit is made to adhere to a sheet.

At Step S8, the clear toner image height is determined for each pixel by subtracting the summed height of the color toner images from the target total height of the color toner images and the clear toner image (Step S8). Then, the information on the clear toner specific gravity is read from the storage unit 50, and the clear toner adhesion amount is calculated for each pixel on the basis of the clear toner image height and the clear toner specific gravity by conversion which is reverse of the conversion at Step S4 (Step S9). Then, on the basis of the clear toner adhesion amount for each pixel, the image data for the clear toner (image data showing each pixel with 1 or 0 (or 1 to 0)) is generated (Step S10), and the glossiness correction processing ends.

After the glossiness correction processing, under the control of the control unit 10, the Y, M, C and K image data, on which the image processing has been performed, and the generated image data for the clear toner are outputted from the image processing unit 30 to the image forming unit 40, and the image forming unit 40 forms an image on a sheet on the basis of the Y, M, C and K image data and the image data for the clear toner. Consequently, the clear toner image height is adjusted for each pixel so that the image surface becomes smooth.

Figure 9A:
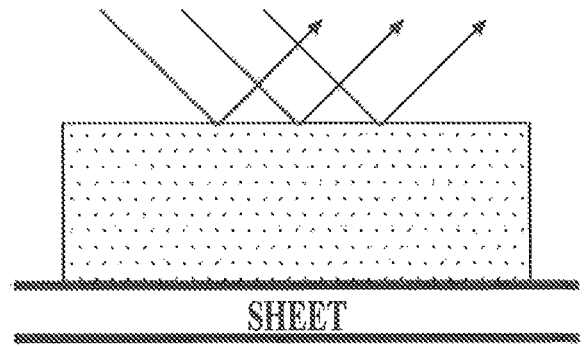
FIGS. 9A, 9B and 9C show sections of output images obtained by performing the glossiness correction processing on image data of the primary color.
Figure 9B:
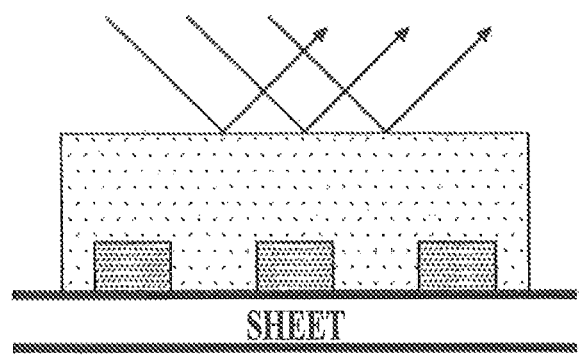
Figure 9C:
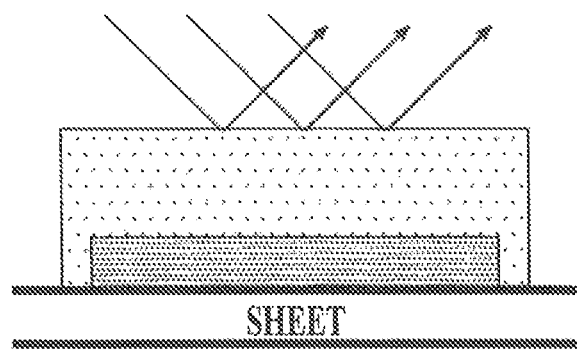

FIGS. 9A to 9C show sections of output images (images formed on sheets) obtained by performing the above-described glossiness correction processing on image data of the primary color. FIGS. 9A, 9B and 9C show the sections of the images having gradations of 0%, 50% and 100%, respectively. As shown in FIGS. 9A to 9C, when the glossiness correction processing is performed, the toner image height becomes uniform regardless of the gradation level, and accordingly the image surface becomes smooth.

Figure 10A:
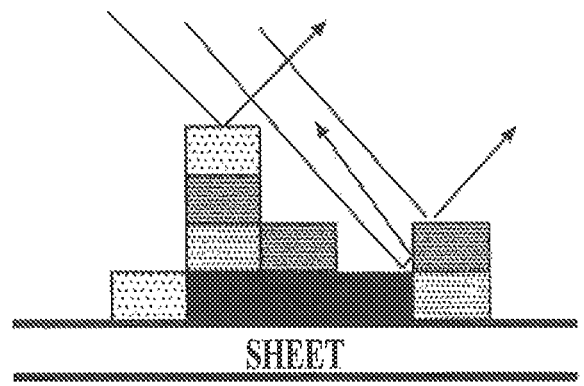
FIGS. 10A and 10B show a section of an output image with the glossiness correction processing, which is shown in FIG. 6, and a section of an output image without the glossiness correction processing, respectively, on image data of the quartic color.
Figure 10B:
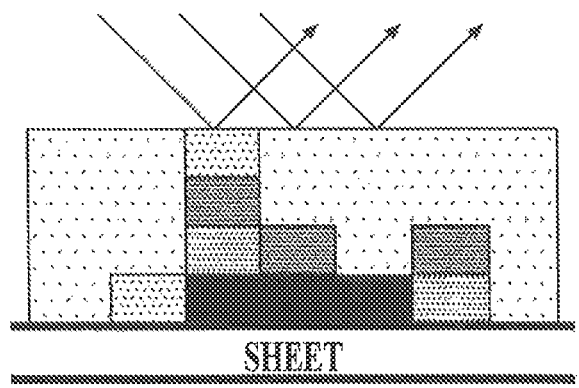

FIGS. 10A and 10B show sections of output images obtained by performing the above-described glossiness correction processing and not performing the glossiness correction processing on image data of the quartic color, respectively.

FIG. 10A shows the section of the image without the glossiness correction processing. FIG. 10B shows the section of the image with the glossiness correction processing. As shown in FIG. 10A, when the glossiness correction processing is not performed, there is roughness on the surface of the output image, and the glossiness is not uniform. On the other hand, as shown in FIG. 10B, when the glossiness correction processing is performed, the toner image height (the total height of the clear toner images and the clear toner image) of the output image becomes uniform (the same) in all the pixels of the output image, and accordingly the image surface becomes smooth.

Figure 11:
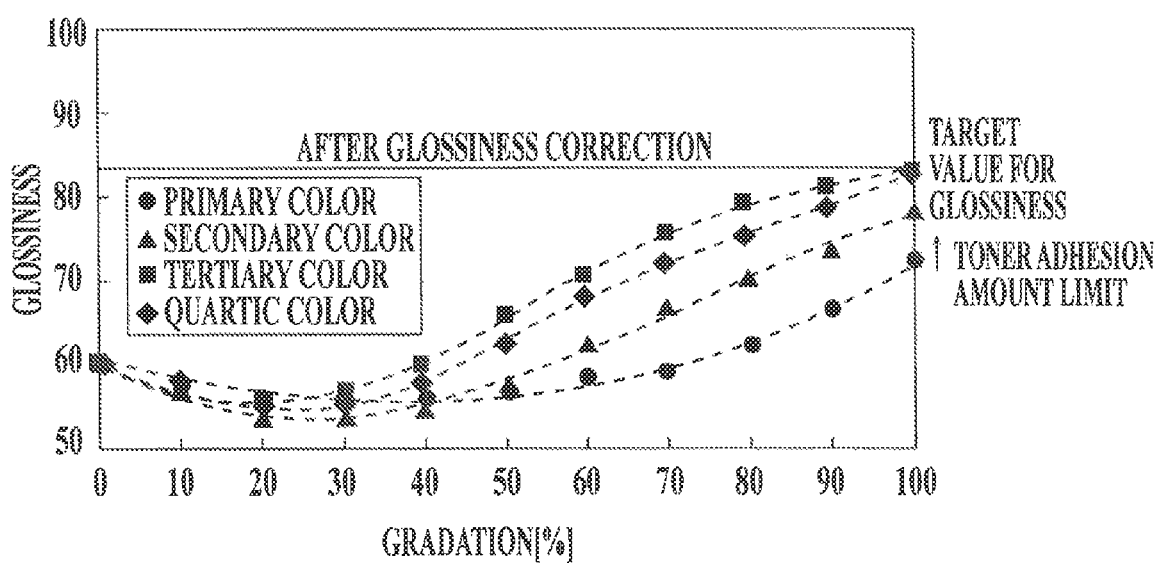
FIG. 11 is a graph showing a gradation-glossiness characteristic with the glossiness correction processing, which is shown in FIG. 6, and a gradation-glossiness characteristic without the glossiness correction processing.

Hence, the gradation-glossiness characteristic after the glossiness correction processing is, as shown in FIG. 11, shown by a straight line. That is, an excellent output image with no gloss unevenness can be obtained by the glossiness correction processing regardless of the gradations, the colors and the order colors of the input image data. Curves for the primary color, the secondary color, the tertiary color and the quartic color shown by broken lines in FIG. 11 each indicate the gradation-glossiness characteristic with no glossiness correction processing. In addition, FIG. 11 shows the gradation-glossiness characteristic with the highest glossiness of the tertiary color as the toner adhesion amount limit. Consequently, the toner adhesion amount of the quartic color is reduced with respect to all the gradations in terms of maintaining gradation continuity. Therefore, the toner adhesion amount of the quartic color shown in FIG. 11 is smaller than the toner adhesion amount thereof shown in FIG. 5 overall.

As described above, the image forming apparatus 1 of the first embodiment (i) calculates the summed height of the color toner images formed on a sheet by summing up the heights of the color toner images on the basis of the input image data, (ii) calculates the height of the clear toner image by subtracting the summed height of the color toner images from the target total height of the color toner images and the clear toner image to realize the target value for glossiness, and (ii) adjusts, on the basis of the calculated height of the clear toner image, the height of the clear toner image formed on the sheet by the image forming unit 40.

Accordingly, regardless of the gradations, the colors and the order colors of the input image data, the total height of the color toner images and the clear toner images is uniform (the same in all the pixels), and accordingly an image having uniform glossiness can be provided.

Further, the height of the clear toner image (clear toner image height) is calculated for each pixel, and the height of the clear toner image formed on a sheet is adjusted for each pixel. Accordingly, the glossiness can be more uniform.

Further, the target value for glossiness is the height glossiness achievable by the image forming apparatus 1. Accordingly, an image having the glossiness not only being uniform but also the highest achievable by the image forming apparatus 1 can be provided.

As described in the embodiment, it is preferable that the total height of the toner images be controlled one pixel by one pixel so that the total height of the toner images formed on a sheet is uniform (the same) in all pixels. However, it is expected that the total height thereof can be uniform to some extent by pressure and heat onto the toner layers for fixing. Hence, even when the total height of the toner images is not controlled one pixel by one pixel, it can be expected that the present invention make the glossiness sufficiently uniform as compared with the conventional technologies.

Further, in the embodiment, the height of each toner image is calculated on the basis of its toner specific gravity and its toner adhesion amount. However, for example, the height of each toner image may be calculated on the basis of the diameter of its toner powder and the toner adhesion amount if there is a predetermined relationship between the diameter of a toner powder and the height of a toner image.

Second Embodiment

In the following, a configuration and operation of an image forming apparatus in accordance with a second embodiment of the present invention are described with reference to the drawings in detail. In the embodiment, as the image forming apparatus, a color image forming apparatus 1 is described. However, this is not a limitation, and hence the present invention can be realized, for example, by a monochrome image forming apparatus too.

[Configuration of Image Forming Apparatus 1]

A functional configuration of the image forming apparatus 1 of the second embodiment is almost the same as that shown in FIG. 1. Hence, different points are described in the following.

Figure 12:
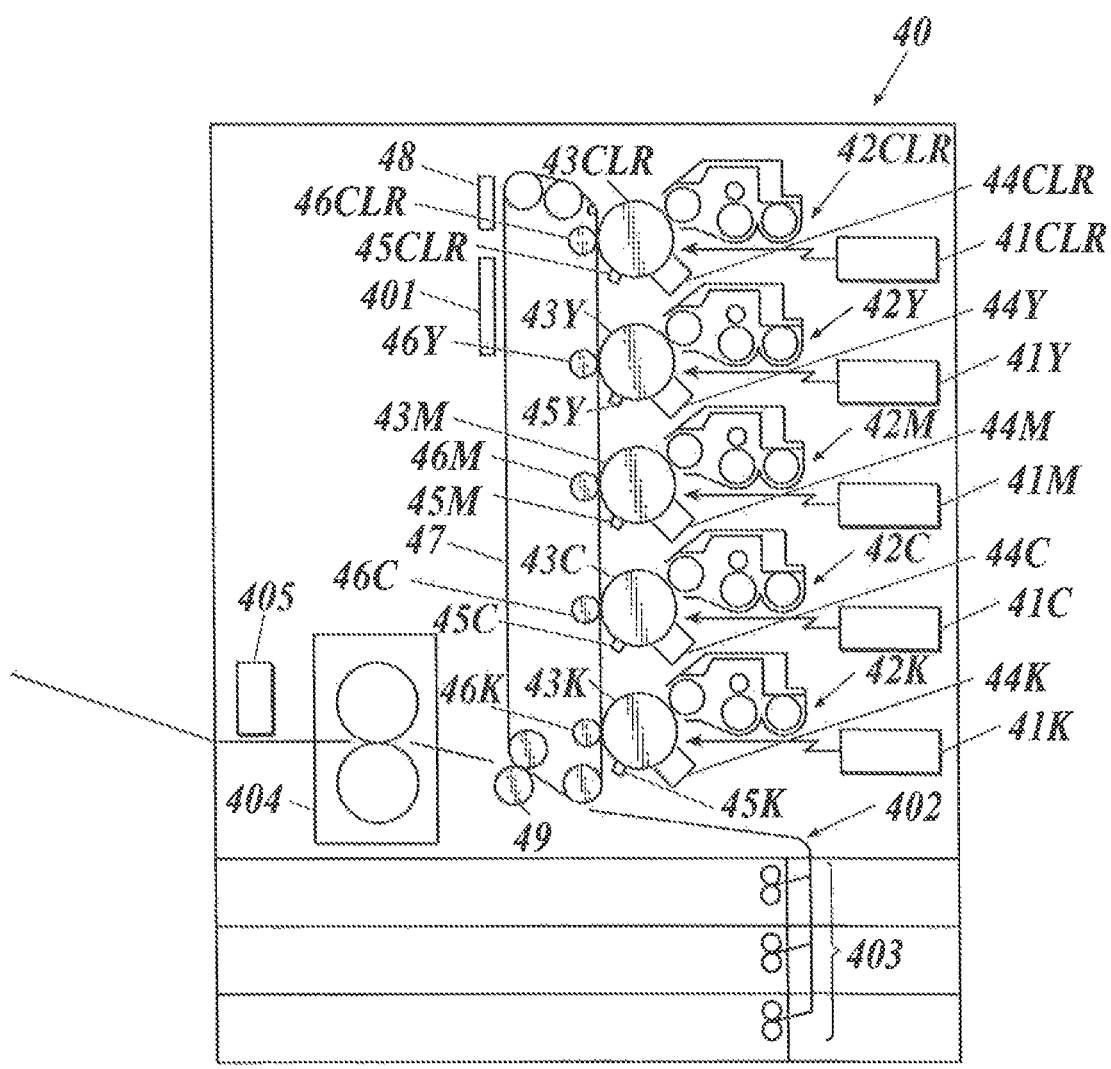
FIG. 12 schematically shows an example of a configuration of an image forming unit in accordance with a second embodiment of the present invention.

FIG. 12 schematically shows a configuration of the image forming unit 40 of the image forming apparatus 1 in accordance with the second embodiment. In the first embodiment, as shown in FIG. 2, the image forming units, which respectively use yellow, magenta, cyan, black and clear toners, are disposed in a horizontal direction. However, the image forming units may be disposed in a vertical direction as shown in FIG. 12. The parts sharing the reference numbers in FIG. 2 and FIG. 12 are the same in configuration.

The image forming unit 40 of the second embodiment includes a glossiness sensor 405 as shown in FIG. 12. The glossiness sensor 405 is disposed on the downstream of the fixing unit 404, and is a glossiness detection unit which detects glossiness of an image fixed on a sheet so as to output the detected glossiness to the control unit 10. The glossiness indicates the degree of roughness on the surface of an image (image surface) formed on a sheet. The higher the glossiness is, the smoother the image surface is. As the glossiness sensor 405, for example, a sensor configured to measure the glossiness by a method prescribed in JISZ8741 or the like can be used.

The storage unit 50 of the second embodiment stores a target value for glossiness, a target total toner adhesion amount of CLR, Y, M, C and K toners corresponding to the target value for glossiness, the maximum toner adhesion amount (the maximum toner adhesion amount formable (achievable) by the image forming apparatus 1) of each of the CLR, Y, M, C and K toners, printing position information on CLR, Y, M, C and K toner images (color toner images) as forming position information, the printing position information which is obtained by the resist control, and printing position information on a CLR toner image (clear toner image) with respect to the color toner images as forming position information, the printing position information which is obtained by glossiness adjustment processing described below.

The other points of the configuration of the image forming apparatus 1 of the second embodiment are the same as those described in the first embodiment, and hence the description thereof is omitted here.

[Change of Glossiness in Electrophotographic System]

As is the case with the image forming apparatus 1 of the first embodiment, when screening, error diffusion or the like is performed so that gradation reproduction is performed by area coverage modulation, the number of expressible densities increases, and gradation continuity can be reproduced. On the other hand, as described in the first embodiment too, the area coverage modulation has the problem that the glossiness changes depending on the gradation level because the toner adhesion amount changes depending on the gradation level. (Refer to FIG. 13.)

Figure 13:
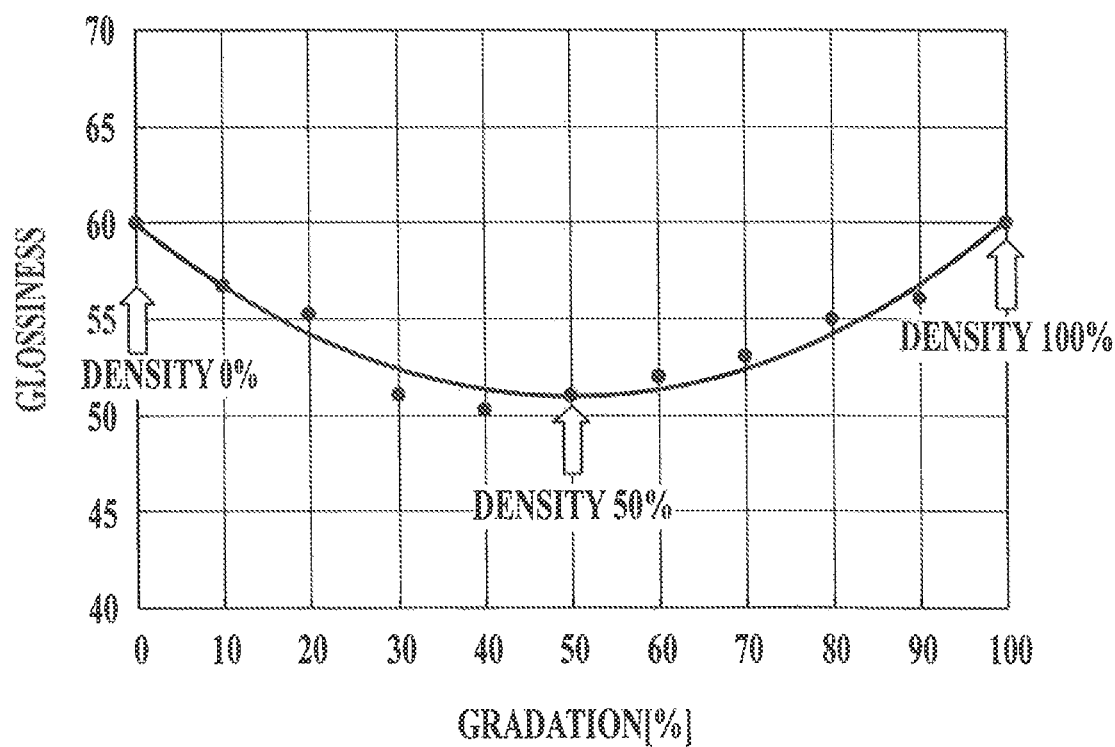
FIG. 13 is a graph showing a relationship (gradation-glossiness characteristic) between a gradation (density) level (%) and glossiness about the primary color.
Figure 14A:
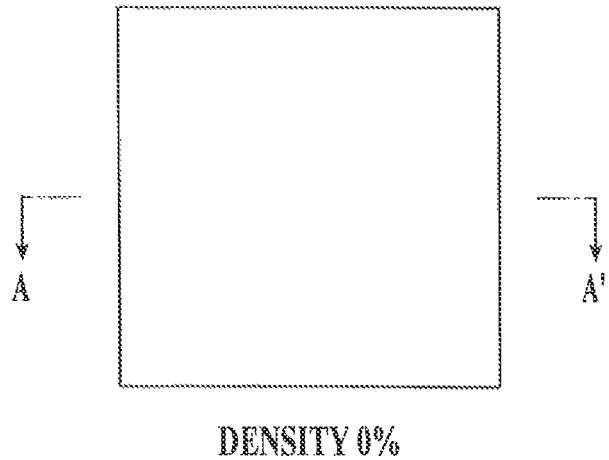
FIGS. 14A, 14B and 14C show output images having densities of 0%, 50% and 100% viewed from above, respectively.
Figure 14B:
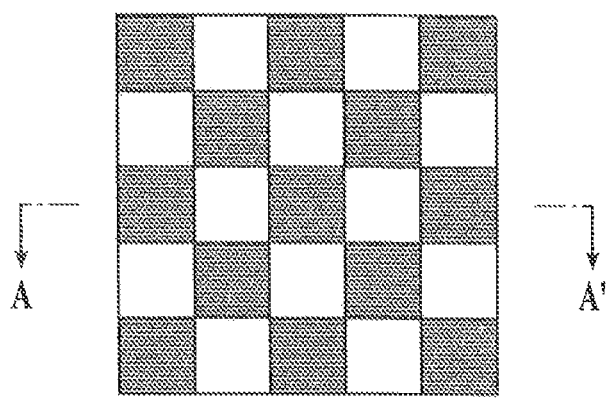
Figure 14C:
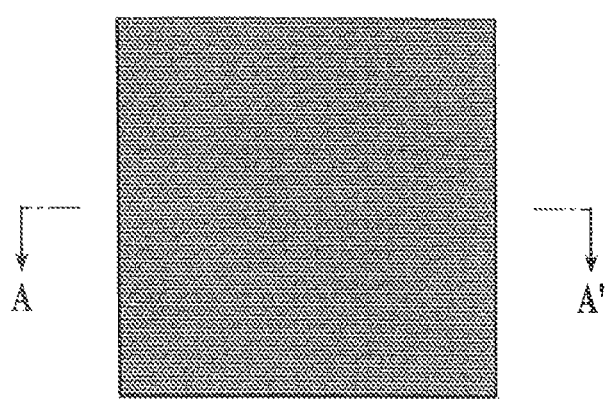
Figure 15A:
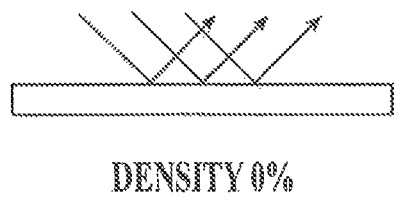
FIGS. 15A, 15B and 15C show sections of the output images having densities of 0%, 50% and 100% taken along A-A' in FIGS. 14A, 14B and 14C, respectively.
Figure 15B:
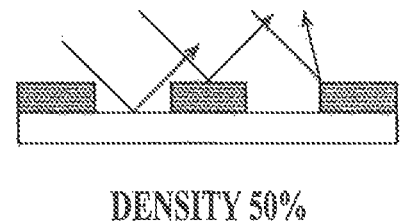
Figure 15C:
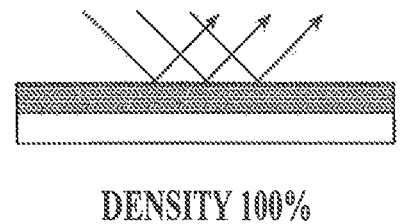

FIG. 13 is a graph showing a relationship (gradation-glossiness characteristic) between the gradation (density) level (%) and the glossiness about the primary color (one of Y, M, C and K). FIGS. 14A, 14B and 14C show output images (images formed on sheets by the image forming unit 40) having densities of 0%, 50% and 100% viewed from above, respectively. FIGS. 15A, 15B and 15C show sections of the output images having densities of 0%, 50% and 100% taken along A-A' in FIGS. 14A, 14B and 14C, respectively. Arrows in FIGS. 15A to 15C indicate reflection of light on the surfaces of the output images.

Although the Y, M, C and K toners are a little different in characteristics, they all have characteristics similar to those shown in FIGS. 13, 14A to 14C, and 15A to 15C.

As shown in FIGS. 14A and 15A (density: 0%), in the case of a density of 0%, there is no toner at all on a sheet. Hence, the glossiness at a density of 0% depends on the surface nature of a sheet. The surface of a sheet is relatively smooth. Hence, as shown in FIG. 13, the glossiness at a density of 0% shows a relatively high value.

When the gradation level increases, a gradation is expressed by area coverage modulation (halftone dots). Hence, as shown in FIGS. 14B and 15B (density: 50%), roughness is produced by the toner on a sheet. Because of the roughness, the specular reflection light decreases, and diffused reflection light increases. Hence, as shown in FIG. 13, the glossiness decreases as compared with the case of a density of 0%. The glossiness at a density of around 50% is the lowest.

After that, the higher the gradation level is, the more the toner adhesion amount occupying the surface of a sheet is, and the smoother the image surface is gradually. In the case of a density of 100%, as shown in FIGS. 14C and 15C (density: 100%), the toner is uniformly disposed on a sheet with a predetermined amount. Because the surface of a toner image (image surface) having a uniform height at points (pixels) is relatively smooth, as shown in FIG. 13, the glossiness is a high value again.

The more the toner adhesion amount is, the less the amount of light penetrating the toner is and the more the amount of light regularly (specularly) reflected (specular reflection light) by the toner is, and accordingly the higher the glossiness is.

[Operation of Image Forming Apparatus 1]

In order to control the change of the glossiness depending on the gradation level, and provide an image having stable glossiness with no gloss unevenness, the image forming apparatus 1 of the second embodiment performs the glossiness adjustment processing and image formation control processing described below.

In the image forming apparatus 1, the control unit 10 controls the units and the like of the image forming unit 40 so as to perform the image stabilization control and the resist control before the glossiness adjustment processing.

In the following, the glossiness adjustment processing and the image formation control processing are described.

FIG. 16 shows a flowchart of the glossiness adjustment processing. The glossiness adjustment processing is performed by the control unit 10 when execution of a glossiness adjustment operation is instructed from the operation unit 22. The control unit 10 functions as a glossiness adjustment unit by performing the glossiness adjustment processing.

First, image data for the color (Y, M, C and K) toners for a detection-use pattern image P1 are generated (Step T1).

FIG. 17A shows color toner patterns of the detection-use pattern image P1 as an example. As shown in FIG. 17A, the detection-use pattern image P1 is an image in which three patterns P are disposed in a direction (main-scanning direction) perpendicular to a sheet conveyance direction, and six patterns P are disposed in the sheet conveyance direction (sub-scanning direction), whereby patterns P11 to P63 (18 patterns P) are disposed. Each of the patterns P11 to P63 includes a color toner pattern and a clear tonner pattern. At Step T1, the image data for the color toner patterns shown in FIG. 17A are generated. As enlarged and shown in FIG. 17B, the color toner patterns of the patterns P11 to P63 are constituted of halftone dots for a density of 50%. The reason why the patterns P11 to P63 are constituted of halftone dots for a density of 50% is because the glossiness at a density of 50% is the lowest in the gradation-glossiness characteristic shown in FIG. 13, thereby being a specific point, and accordingly detection sensitivity thereat is high. However, the patterns P11 to P63 may be constituted of halftone dots for a density of another value (%). Further, the color toner patterns may be constituted of one color (the primary color) or a plurality of colors (the secondary color, the tertiary color or the quartic color).

The image data for the color toners of the detection-use pattern image P1 may be stored in the storage unit 50 in advance.

Next, image data for the clear (CLR) toner of the detection-use pattern image P1 is generated (Step T2). The image data for the clear toner is calculated for each pixel by the following Equation 1. By Equation 1, the image data for the clear toner can be generated in such a way that, with respect to each pattern P, the total of the toner adhesion amounts (total toner adhesion amount) of the color toners and the clear toner is the same in all the pixels of the detection-use pattern image P1, namely, uniform in all the pixels thereof, and the glossiness of the image surface reaches a predetermined target value for glossiness.

$$Dat\_{CLR} = \frac{\{M\_{target} - \sum (Dat\_{(C,M,Y,K)} \times M\_{(C,M,Y,K)})\}}{M\_{CLR}}$$ [Equation 1]

Dat_(C,M,Y,K): image data for color (C, M, Y and K) toners in a predetermined pixel M_target: a target total adhesion amount of the clear toner and the color (C, M, Y and K) toners obtained from a target value for glossiness M_(C,M,Y,K): the respective maximum adhesion amounts of the color (C, M, Y and K) toners M_CLR: the maximum adhesion amount of the clear toner More specifically, by Equation 1, (i), for each pixel, the summed toner adhesion amount of the color toners is calculated by summing up the toner adhesion amounts of the color toners on the basis of the image data for the color toners, (ii) for each pixel, the toner adhesion amount of the clear toner is calculated by subtracting the summed toner adhesion amount of the color toners from the target total toner adhesion amount of the color toners and the clear toner, and (iii) the image data for the clear toner is generated on the basis of the toner adhesion amount of the clear toner calculated for each pixel.

Here, the target value for glossiness is the highest glossiness achievable by the image forming apparatus 1, and stored in the storage unit 50 in advance. In general, an image forming apparatus is provided with the toner adhesion amount limit in terms of the limits of a fixing characteristic thereof. The highest glossiness achievable by the image forming apparatus 1 is the glossiness achieved when the maximum toner adhesion amount within the toner adhesion amount limit is made to adhere to a sheet.

Next, the printing position information on the CLR, Y, M, C and K toner images calculated by the resist control and stored in the storage unit 50 is read and obtained (Step T3), and the image forming unit 40 forms the detection-use pattern image P1 on a sheet on the basis of the image data generated at Steps T1 and T2 (Step T4). Here, the processing is controlled on the basis of the printing position information on each toner obtained at Step T3. Accordingly, the shifts of the forming positions, namely, the printing positions, of the toner images on the intermediate transfer belt 47 are corrected. Further, the detection-use pattern image P1 is formed by changing a printing position of a clear toner patter of each pattern P with respect to a printing position of a color toner pattern thereof stepwise.

Figure 18:
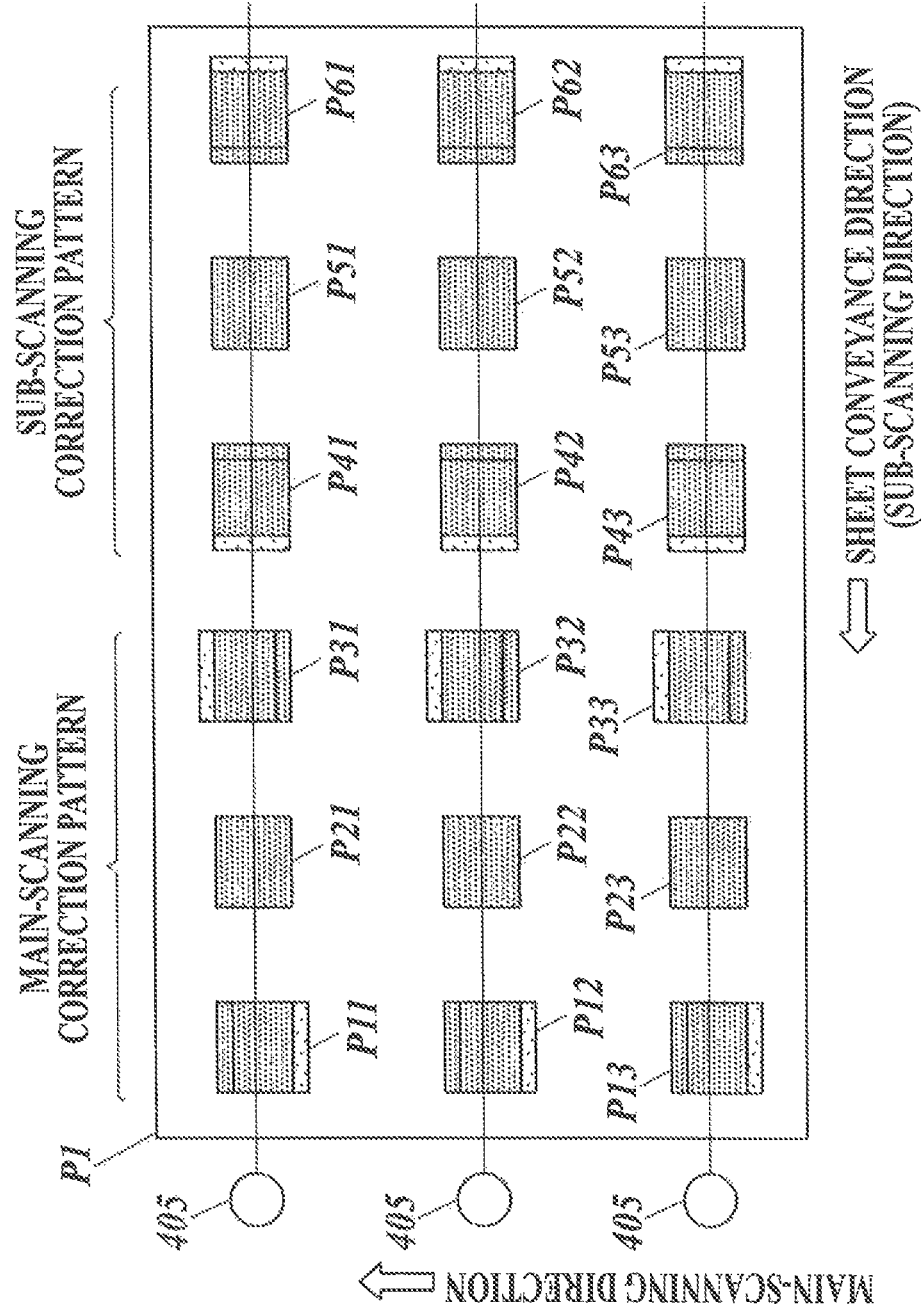
FIG. 18 shows an example of a detection-use pattern image in which both color toner patterns and clear toner patterns are formed.

Here, the detection-use pattern image P1 formed on a sheet is described in detail. FIG. 18 shows an example of the detection-use pattern image P1 in which both the color toner patterns and the clear toner patterns are formed.

The patterns P11 to P33 of the detection-use pattern image P1 shown in FIG. 18 constitute a main-scanning correction pattern used for correcting the printing positions in the main-scanning direction. At each of three points in the main-scanning direction, three patterns P, which are obtained by shifting a printing position of a clear toner pattern with respect to a printing position of a color toner pattern in the main-scanning direction stepwise, are formed (on the right, the center and the left in the main-scanning direction). The patterns P41 to P63 of the detection-use pattern image P1 shown in FIG. 18 constitute a sub-scanning correction pattern used for correcting the printing positions in the sub-scanning direction. At each of three points in the main-scanning direction, three patterns P, which are obtained by shifting a printing position of a clear toner pattern with respect to a printing position of a color toner pattern in the sub-scanning direction stepwise, are formed (on the right, the center and the left in the main-scanning direction). The reason why the same patterns P are disposed at the three points in the main-scanning direction is to increase the detection accuracy of the glossiness by taking an average of the glossiness at plural points. The number of the points is not limited three.

Figure 19A:
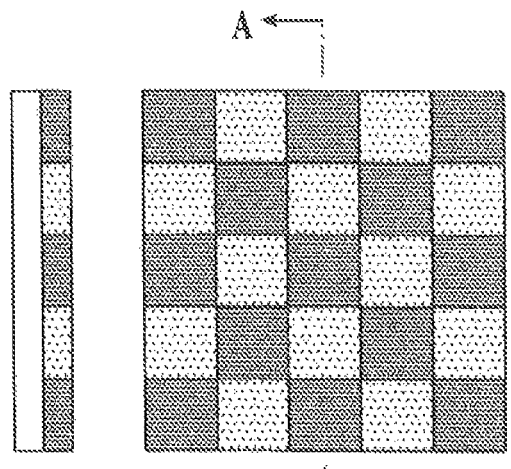
FIGS. 19A, 19B and 19C are enlarged views showing pattern change when a printing position of a clear toner pattern is shifted with respect to a printing position of a color toner pattern in a main-scanning direction stepwise (three steps in the embodiment)
Figure 19B:
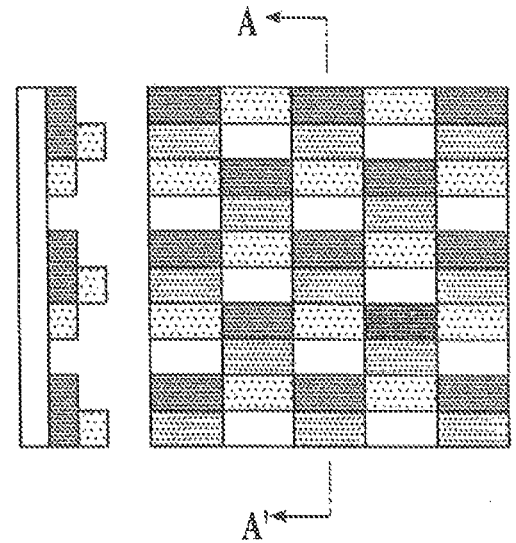
Figure 19C:
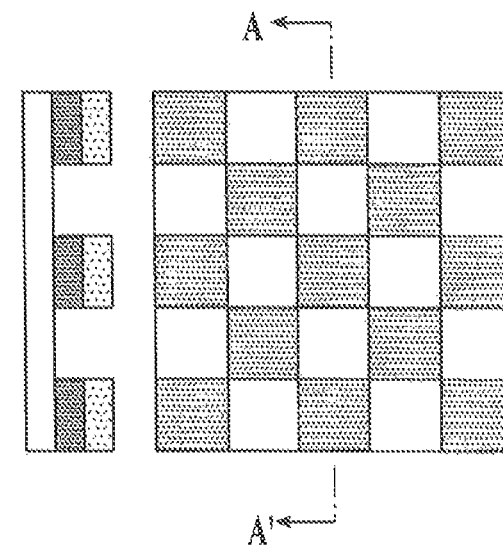

FIGS. 19A to 19C are enlarged views each showing pattern change when a printing position of a clear toner pattern is shifted with respect to a printing position of a color toner pattern in the main-scanning direction stepwise (three steps in the embodiment) (enlarged views of patterns P in a row of the main-scanning correction pattern in FIG. 18). The right parts of FIGS. 19A to 19C are top views of the patterns, and the left parts of FIGS. 19A to 19C show sections of the patterns taken along A-A' of the top views.

Figure 20A:
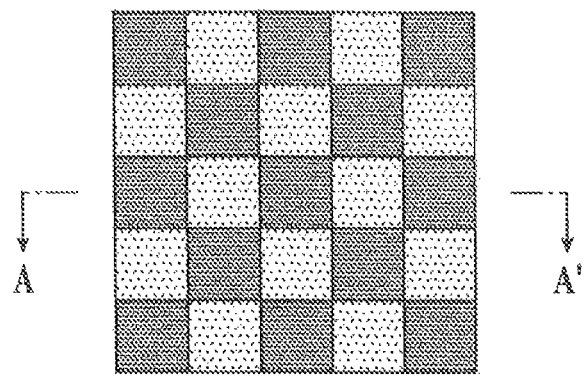
FIGS. 20A, 20B and 20C are enlarged views showing pattern change when a printing position of a clear toner pattern is shifted with respect to a printing position of a color toner pattern in a sub-scanning direction stepwise (three steps in the embodiment)
Figure 20B:
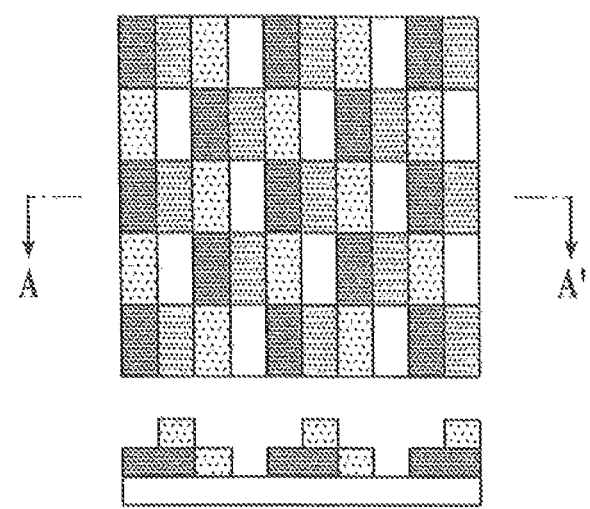
Figure 20C:
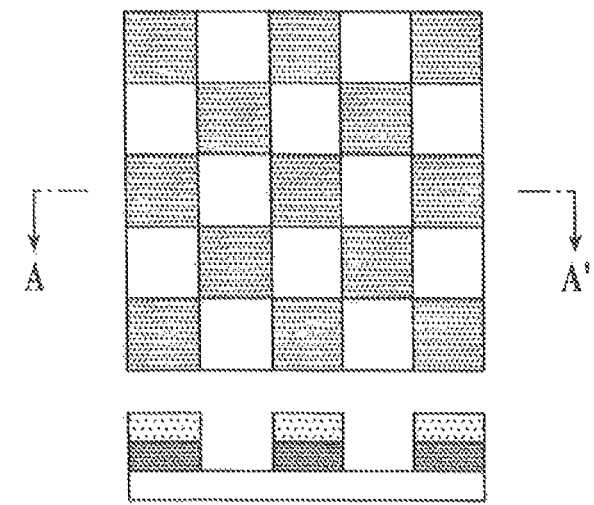

FIGS. 20A to 20C are enlarged views each showing pattern change when a printing position of a clear toner pattern is shifted with respect to a printing position of a color toner pattern in the sub-scanning direction stepwise (three steps in the embodiment) (enlarged views of patterns P in a row of the sub-scanning correction pattern in FIG. 18). The upper parts of FIGS. 20A to 20C are top views of the patterns, and the lower parts of FIGS. 20A to 20C show sections of the patterns taken along A-A' of the top views. The vertical direction in FIGS. 19A to 20C is the main-scanning direction in FIGS. 17A to 18, and the horizontal direction in FIGS. 19A to 20C is the sub-scanning direction in FIGS. 17A to 18.

Figure 21:
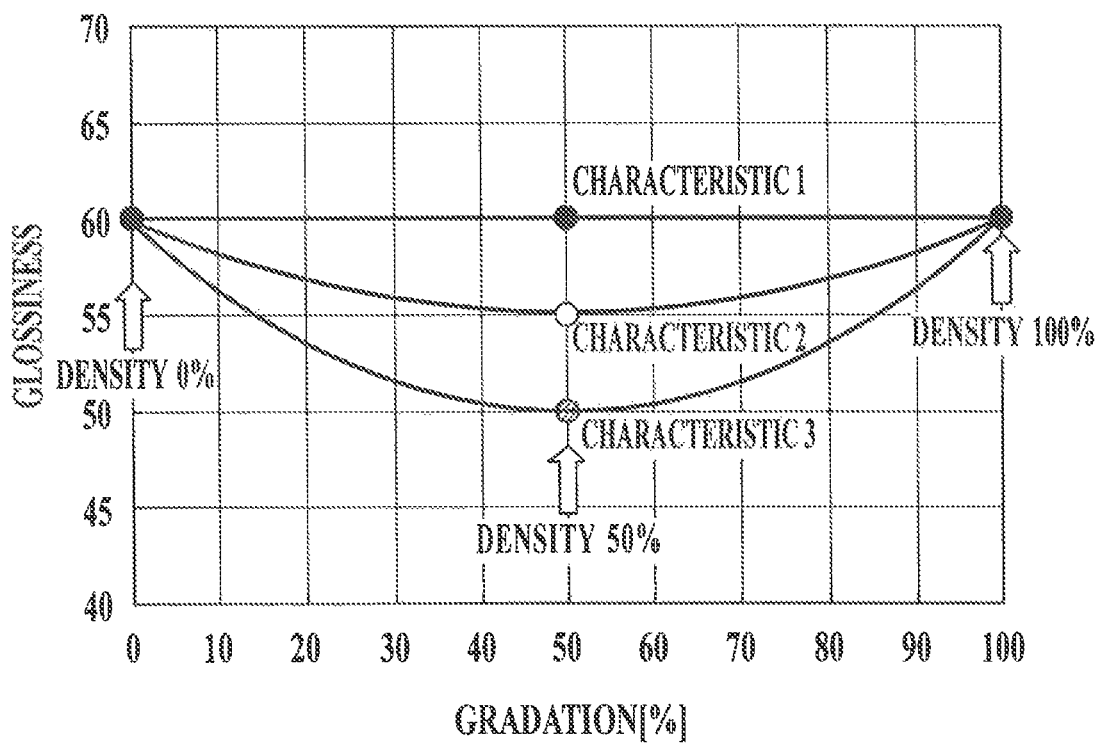
FIG. 21 is a graph showing change of a relationship (gradation-glossiness characteristic) between a gradation (%) level and glossiness when a printing position of a clear toner pattern is shifted with respect to a printing position of a color toner pattern stepwise.

FIG. 21 shows a relationship between the gradation (%) and the glossiness (gradation-glossiness characteristic) in the case where a printing position of a clear toner pattern is shifted with respect to a printing position of a color toner pattern stepwise as shown in FIGS. 19A to 20C.

For ease of explanation, FIGS. 19A to 20C show a case where the color toner patterns of the detection-use pattern image P1 are constituted of one color (the primary color), and accordingly, for the target total toner adhesion amount of the color toners and the clear toner corresponding to the target value for glossiness, the maximum toner adhesion amount of the color toner is used.

For example, in the case where the detection-use pattern image P1 is formed, if a clear toner pattern of a pattern is printed in such a way that a printing position of the clear toner pattern matches a printing position of a color toner pattern of the pattern, namely, a printing position of each pixel of the image data for the clear toner matches a printing position of its corresponding pixel of the image data for the color toner, because the image data for the clear toner is generated by Equation 1, as shown in FIGS. 19A and 20A, the surface of the pattern is smooth, and as shown by a characteristic 1 in FIG. 21, the gradation-glossiness characteristic does not change regardless of the gradations (densities).

In the case where the detection-use pattern image P1 is formed, if a printing position of a clear toner pattern of a pattern is shifted with respect to a printing position of a color toner pattern thereof, namely, a printing position of each pixel of the image data for the clear toner is shifted with respect to a printing position of its corresponding pixel of the image data for the color toner, and as shown in FIGS. 19C and 20C, a position of a pixel where the color toner adheres matches a position of a pixel where the clear toner adheres, the surface of the pattern is rough, and the gradation-glossiness characteristic is a characteristic 2 shown in FIG. 21, which is lower than the characteristic 1.

In the case where the detection-use pattern image P1 is formed, if a printing position of a clear toner pattern of a pattern is shifted with respect to a printing position of a color toner pattern thereof, namely, a printing position of each pixel of the image data for the clear toner is shifted with respect to a printing position of its corresponding pixel of the image data for the color toner, and as shown in FIGS. 19B and 20B, a position of a pixel where the color toner adheres overlaps with a position of a pixel where the clear toner adheres, the surface of the pattern is more rough, and the gradation-glossiness characteristic is a characteristic 3 shown in FIG. 21, which is lower than the characteristic 2.

Thus, the gradation-glossiness characteristic changes depending on a printing position of a clear toner pattern with respect to a printing position of a color toner pattern. That is, when the color shift occurs among the color toner images and the clear toner image, even if images are formed on the basis of the same image data on sheets, the glossiness changes (different).

The color shift among the CLR, C, M, Y and K toners is corrected by the resist control, which is performed on the intermediate transfer belt 47 without a sheet passing thereon. Hence, even if the resist control has been performed, when an image is formed on a sheet, the color shift may occur by a load for sheet conveyance onto the secondary transfer roller 49 or the like (a vibration, a shock or the like to the secondary transfer roller 49 caused by a sheet passing through the secondary transfer roller 49). Hence, the image forming apparatus 1 forms the detection-use pattern image P1, in which printing positions of clear toner patterns are shifted (different) with respect to printing positions of color toner patterns stepwise, on a sheet, and reads the detection-use pattern image P1 with the glossiness sensory 405. Then, the image forming apparatus 1 (i) obtains, on the basis of a printing position of a clear toner pattern with respect to a printing position of a color toner pattern of a pattern P of the detection-use pattern image P1, the pattern P, the glossiness of which reaches the target value for glossiness, the printing position information on a printing position of the clear toner image with respect to printing positions of the color toner images, and (ii) controls, on the basis of the obtained printing position information, a printing position of a clear toner image with respect to printing positions of color toner images when an image is formed on a sheet on the basis of the input image data. Accordingly, an image having stable glossiness with no gloss unevenness can be provided.

Backing to FIG. 16, when the detection-use pattern image P1 is formed on a sheet, the formed detection-use pattern image P1 is detected by the glossiness sensor 405 (Step T5), and detection information is obtained (Step T6).

Then, among the patterns P in the detection-use pattern image P1, the glossiness of a pattern P having the highest glossiness is compared with the target value for glossiness (Step T7). As a result of the comparison, when the glossiness of the pattern P, which has the highest glossiness, dose not reach the target value for glossiness (Step T7; NO), the printing positions of the clear toner patterns of the patterns P are changed (shifted stepwise) (Step T8). Then, the processing is returned to Step T3, and Steps T3 to T6 are repeated. When the glossiness of the pattern P, which has the highest glossiness, reaches the target value for glossiness (Step T7; YES), on the basis of the printing position of the clear toner pattern with respect to the printing position of the color toner pattern of the pattern P, the printing position information on a printing position of a clear toner image with respect to printing positions of color toner images is calculated, and the calculated printing position information is stored in the storage unit 50 (Step T9), whereby the glossiness adjustment processing ends.

Next, the image formation control processing in accordance with the second embodiment is described.

Figure 22:
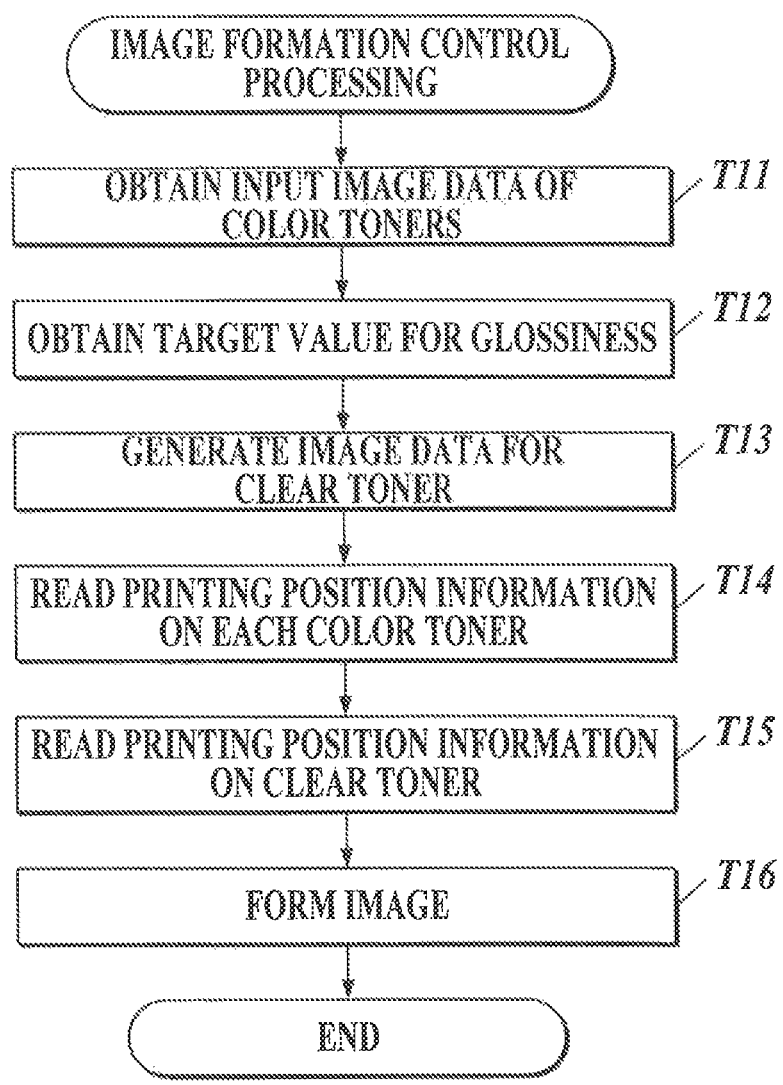
FIG. 22 is a flowchart of image formation control processing performed by the control unit shown in FIG. 1.

FIG. 22 is a flowchart of the image formation control processing. The image formation control processing is performed by the control unit 10 when image data is inputted via the communication unit 60.

First, the image processing is performed on the Y, M, C and K image data (image data for the color toners) of the input image data by the image processing unit 30 so that the input image data of area coverage modulation is obtained (Step T11). Next, the target value for glossiness is obtained from the storage unit 50 (Step T12), and the image data for the clear toner is generated in such a way that the glossiness of an output image is the target value for glossiness (Step T13). Here, as is the case with the glossiness adjustment processing, the image data for the clear toner is calculated for each pixel by Equation 1.

Next, the printing position information on the color toner images, which is obtained by the resist control, and stored in the storage unit 50, is read (Step T14). That is, the printing position information on the Y, M, C and K toner images is read. In addition, the printing position information on the clear toner image, which is obtained by the glossiness adjustment processing, and stored in the storage unit 50, is read (Step T15). Then, the image forming unit 40 is controlled on the basis of the read printing position information on the color toner images and the read printing position information on the clear toner image so as to form an image adjusted not to cause the color shift among the color toner images and the clear toner image on a sheet on the basis of the input image data, on which the image processing is performed by the image processing unit 30, and the image data for the clear toner, which is generated by the image processing unit 30 (Step T16). When image formation is performed on a predetermine number of sheets, the image formation control processing ends.

As described above, the image forming apparatus 1 (i) generates image data for a detection-use pattern image P1 in such a way that a total toner adhesion amount of color toners and a clear toner is uniform in all the pixels of an image, and glossiness of the surface of the image is a predetermined target value for glossiness, and (ii) forms the detection-use pattern image P1 on a sheet by shifting a printing position of a clear toner pattern with respect to a printing position of a color toner pattern stepwise on the basis of the image data for the detection-use pattern image P1. Then, the image forming apparatus 1 (i) detects the glossiness of the detection-use pattern image P1 with the glossiness sensor 405, (ii) obtains, on the basis of the printing position of the clear toner pattern when the detected glossiness is the predetermined target value for glossiness, printing position information on a printing position of the clear toner image with respect to a printing position of the color toner image, and (ii) controls the printing position of the clear toner image with respect to the printing position of the color toner image on the basis of the obtained printing position information.

Accordingly, an image having stable glossiness with no gloss unevenness can be provided without consuming a large amount of a clear toner.

Further, in order to generate the image data for the clear toner on the basis of the input image data, the image forming apparatus 1 (i) calculates, for each pixel, a summed tonner adhesion amount of the color toners by summing up the toner adhesion amounts of the color toners on the basis of the input image data, (ii) calculates, for each pixel, the toner adhesion amount of the clear toner by subtracting the summed toner adhesion amount of the color toners from a target total toner adhesion amount of the color toners and the clear toner corresponding to the target value for glossiness, and (iii) generates the image data for the clear toner on the basis of the toner adhesion amount of the clear toner calculated for each pixel. Accordingly, the glossiness is more uniform.

Further, the target value for glossiness is the highest glossiness achievable by the image forming apparatus 1. Accordingly, an image having the glossiness not only being stable but also the highest achievable by the image forming apparatus 1 with no gloss unevenness can be provided.

The first and second embodiments are preferred examples of the image forming apparatus of the present invention, and hence the present invention is not limited thereto.

For example, in the first and second embodiments, the highest glossiness achievable by the image forming apparatus 1 is used as the target value for glossiness. However, this is not a limitation. Hence, for example, a user may input (or adjust) the target value for glossiness (glossiness level) with the operation unit 22.

Figure 23:
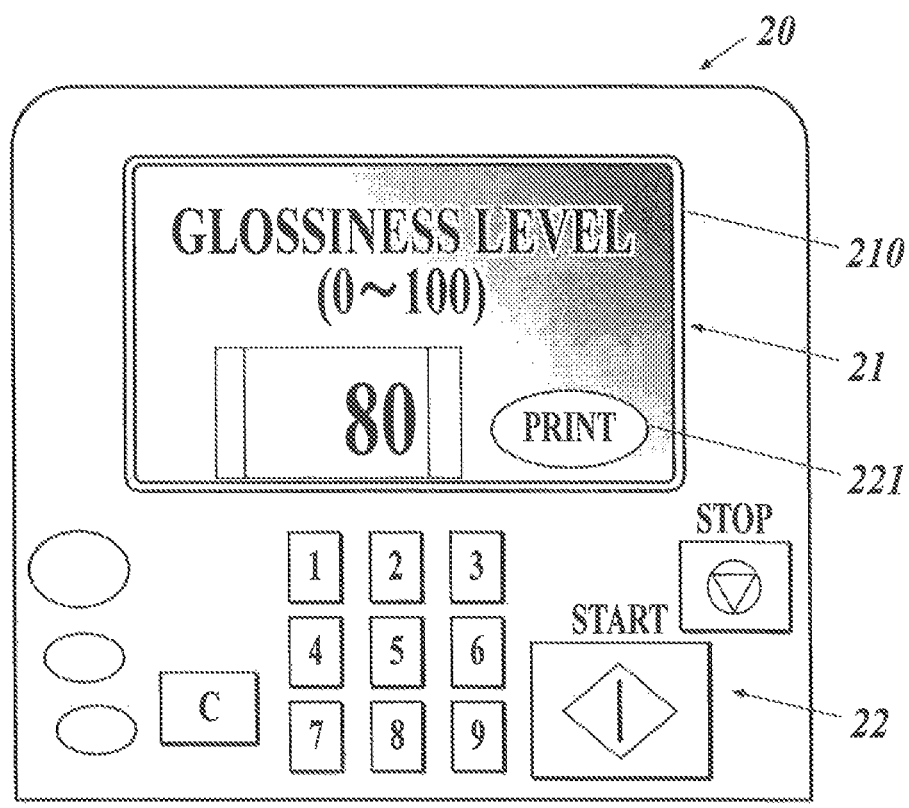
FIG. 23 shows an example of a glossiness adjustment screen.

For example, as shown in FIG. 23, it is possible that a glossiness adjustment screen 210 for a user to input the glossiness level with the operation unit 22 is displayed on the display unit 21, the glossiness level inputted from the operation unit 22 is stored in the storage unit 50, and the glossiness level inputted by the user is used as the target value for glossiness. Accordingly, an image having user's desired glossiness with no gloss unevenness can be outputted.

In the glossiness adjustment screen 210, the glossiness level higher than the highest glossiness achievable by the image forming apparatus 1 can be set. When the glossiness level higher than the highest glossiness achievable by the image forming apparatus 1 is set, first, the glossiness correction processing is performed with the highest glossiness as the target value for glossiness, an image is formed on a sheet, the sheet is once outputted (ejected), and a notice to instruct a user to set the outputted sheet in a paper feeder tray again is displayed on the display unit 21. When the sheet is set in the paper feeder tray, the glossiness correction processing is performed with the remaining glossiness level obtained by subtracting the highest glossiness from the inputted glossiness level as the target value for glossiness, so that a clear toner image which makes up a deficit of the first (previous) image formation is formed on the sheet fed from the paper feeder tray, and the sheet is outputted. Accordingly, an image having the glossiness higher than the highest glossiness can be outputted. Alternatively, for example, on the downstream of the fixing unit 404, in addition to a path to eject a sheet, there may be provided a path to return a sheet, which passes through the fixing unit 404, to a secondary transfer position without reversing the sheet. Accordingly, an image having the glossiness higher than the highest glossiness can be outputted without giving a user trouble. Alternatively, two image forming apparatuses may be disposed in series. Then, the first image forming apparatus performs image formation on a sheet with the highest glossiness as the target value for glossiness, and outputs the sheet without reversing the sheet to the second image forming apparatus, and the second image forming apparatus forms a clear toner image, which makes up a deficit of the image formation performed by the first image forming apparatus, on the sheet, and outputs the sheet.

Further, if the input image data is monochrome or constituted of two colors (the secondary color), the total toner adhesion amount is small. Accordingly, the target value for glossiness may be reduced.

In the case where a user can input the glossiness level, it is preferable to provide, for example, a PRINT button 221 to instruct execution of test printing as shown in FIG. 23, so that the user can confirm the set glossiness level. When the PRINT button 221 is pressed with the operation unit 22, it is preferable to perform the glossiness correction processing with the glossiness level set by a user as the target value for glossiness on a predetermined color toner pattern image for test printing by the image processing unit 30, and perform image formation on a sheet and output the sheet by the image forming unit 40.

Figure 24:
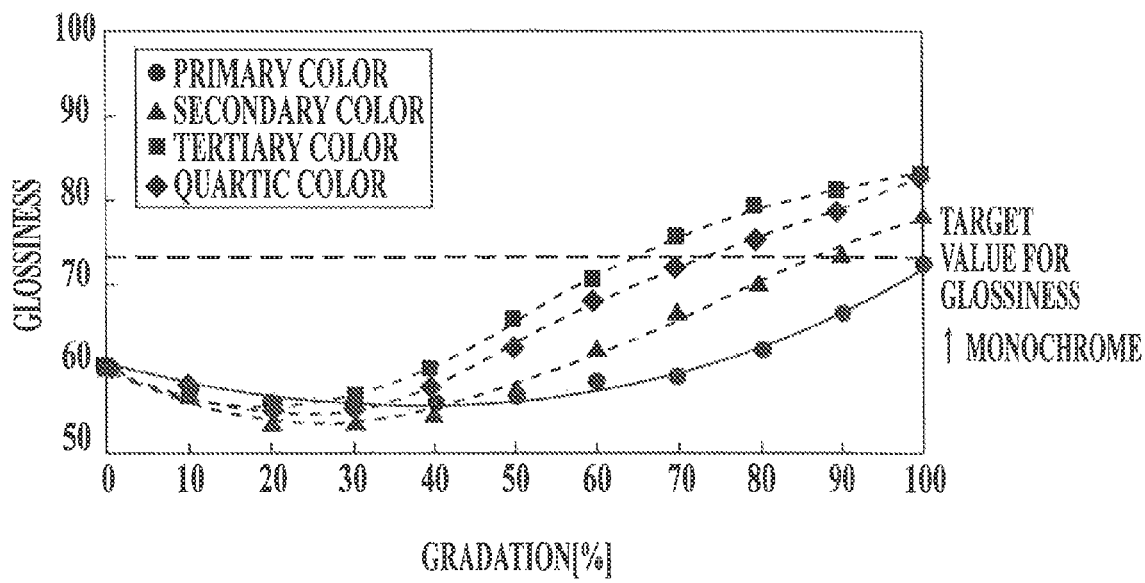
FIG. 24 is a graph showing a target value for glossiness in the case of a monochrome.

Further, the glossiness is different among the primary color, the secondary color, the tertiary color and the quartic color. In general, about the highest glossiness, "the primary color<the secondary color<the tertiary color<the quartic color" holds. About the summed toner adhesion amount of color toners in this case, "the primary color<the secondary color<the tertiary color<the quartic color" holds. Hence, by taking the highest glossiness of the highest order color (in this case, the quartic color) of the input image data as the target value for glossiness, the amount of toners to be used can be reduced. For example, when a monochrome image is printed, because the highest order color of the input image data is the primary color, the highest glossiness of the primary color is taken as the target value for glossiness as shown in FIG. 24. Accordingly, the toner adhesion amount can be reduced as compared with a case where the highest glossiness of the secondary color or a higher order color is taken as the target value for glossiness.

Figure 25:
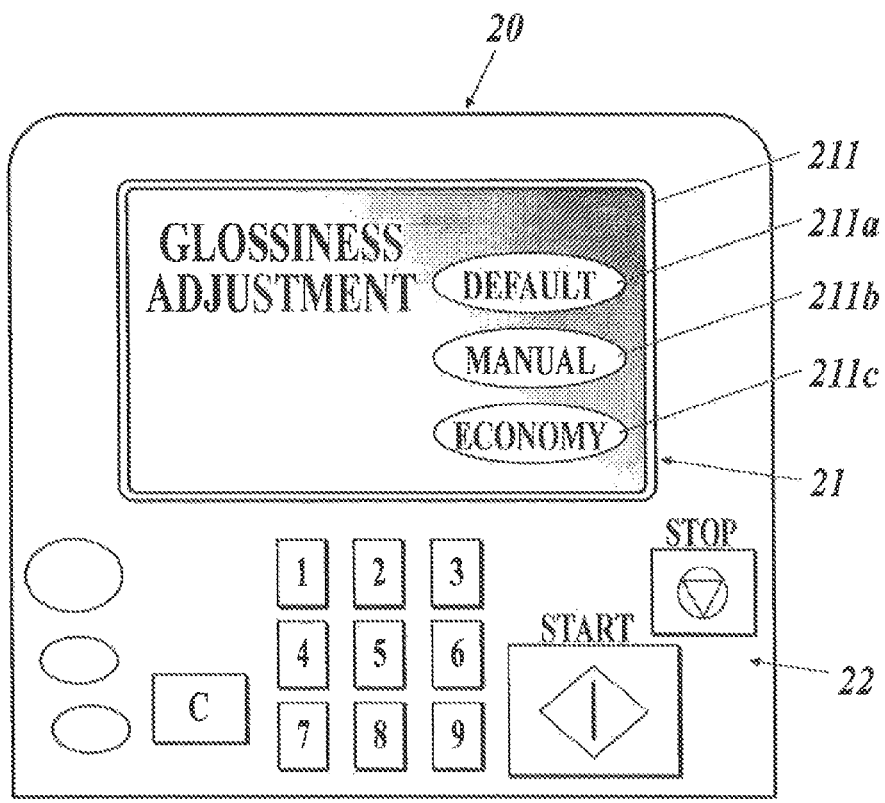
FIG. 25 shows an example of a glossiness adjustment screen having a setting unit.

Further, a user may set the highest glossiness achievable by the image forming apparatus 1, the value (glossiness level) inputted by the user with the operation unit 22 or the highest glossiness achievable by the image forming apparatus 1 in the highest order color of the input image data as the target value for glossiness by using the operation unit 22. For example, as a glossiness adjustment screen 211 shown in FIG. 25, there are provided a default button 221a, a manual button 211b and an economy button 211c as a setting unit. When the default button 211a is pressed with the operation unit 22, the highest glossiness achievable by the image forming apparatus 1 is set as the target value for glossiness. That is, the highest glossiness achievable by the image forming apparatus 1 is stored in a storage region for the target value for glossiness of the storage unit 50. When the manual button 211b is pressed with the operation unit 22, modes are switched so that the glossiness adjustment screen 211 is switched to a screen (the glossiness adjustment screen 210 shown in FIG. 23, for example) where a user can input the glossiness level, and the inputted glossiness level is set as the target value for glossiness. That is, the glossiness level inputted by a user with the operation unit 22 is stored in the storage region for the target value for glossiness of the storage unit 50. When the economy button 211c is pressed with the operation unit 22, the highest glossiness achievable by the image forming apparatus 1 in each of the order colors (the primary color, the secondary color, the tertiary color and the quartic color) is set as the target value for glossiness. That is, the highest glossiness achievable by the image forming apparatus 1 in each of the order colors is stored in the storage region for the target value for glossiness of the storage unit 50. Accordingly, the target value for glossiness can be set by using a method desired by a user.

Further, in the embodiments, a ROM, a nonvolatile memory, a hard disk or the like is used as a computer readable storage medium to read the programs of the present invention. However, this is not a limitation but an example. As another example, a portable storage medium such as a CD-ROM can be used as the computer readable storage medium. Furthermore, a carrier wave can be used as a medium which provides data of the programs of the present invention via a communication line.

Furthermore, the detailed configuration and the detailed operation of the image forming apparatus 1 can be appropriately modified without departing from the spirit of the present invention.

This application is based upon and claims the benefit of priority under 35 USC 119 of Japanese Patent Applications No. 2012-075822 and No. 2012-075824 both filed on Mar. 29, 2012, the entire disclosure of which, including the descriptions, claims, drawings, and abstracts, is incorporated herein by reference in its entirety.

What is claimed is:

1. An image forming apparatus comprising:
   an image forming unit which forms an image constituted of a color toner image and a clear toner image on a sheet, the image forming unit including:
      a color image forming unit which uses a color toner to form the color toner image; and
      a clear image forming unit which uses a clear toner to form the clear toner image;
   a storage unit which stores a predetermined target value for glossiness;
   an image processing unit which (i) calculates a summed height of the color toner image formed on the sheet by summing up a height of the color toner image on the basis of input image data, (ii) calculates, on the basis of the target value for glossiness stored in the storage unit, a target total height of the color toner image and the clear toner image to realize the target value for glossiness, and (iii) calculates a height of the clear toner image by subtracting the summed height of the color toner image from the target total height of the color toner image and the clear toner image; and
   a control unit which adjusts, on the basis of the calculated height of the clear toner image, the height of the clear toner image formed on the sheet by the image forming unit.

2. The image forming apparatus according to claim 1, wherein
   the image processing unit calculates the height of the clear toner image for each pixel, and
   the control unit adjusts, on the basis of the height of the clear toner image calculated for each pixel, the height of the clear toner image for each pixel, the clear toner image which is formed on the sheet by the image forming unit.

3. The image forming apparatus according to claim 1, wherein the target value for glossiness is highest glossiness achievable by the image forming unit.

4. The image forming apparatus according to claim 1 further comprising an operation unit with which a user adjusts the target value for glossiness.

5. The image forming apparatus according to claim 1, wherein the target value for glossiness is highest glossiness achievable by the image forming unit in a highest order color of the input image data.

6. The image forming apparatus according to claim 4 further comprising a setting unit with which highest glossiness achievable by the image forming unit, the target value adjusted by the user with the operation unit or highest glossiness achievable by the image forming unit in a highest order color of the input image data is set as the target value for glossiness, wherein
   the storage unit stores the set target value for glossiness.

7. An image forming method for an image forming apparatus including an image forming unit which forms an image constituted of a color toner image and a clear toner image on a sheet, the image forming unit including a color image forming unit which uses a color toner to form the color toner image and a clear image forming unit which uses a clear toner to form the clear toner image, the image forming method comprising:
   a first calculation step of calculating a summed height of the color toner image formed on the sheet by summing up a height of the color toner image on the basis of input image data;
   a second calculation step of calculating, on the basis of a target value for glossiness stored in a storage unit in advance, a target total height of the color toner image and the clear toner image to realize the target value for glossiness;
   a third calculation step of calculating a height of the clear toner image by subtracting the summed height of the color toner image from the target total height of the color toner image and the clear toner image; and
   an adjustment step of adjusting, on the basis of the calculated height of the clear toner image, the height of the clear toner image formed on the sheet by the image forming unit.

8. The image forming method according to claim 7, wherein
   in the third calculation step, the height of the clear toner image is calculated for each pixel, and
   in the adjustment step, on the basis of the height of the clear toner image calculated for each pixel, the height of the clear toner image is adjusted for each pixel, the clear toner image which is formed on the sheet by the image forming unit.

9. The image forming method according to claim 7, wherein the target value for glossiness is highest glossiness achievable by the image forming unit.

10. The image forming method according to claim 7 further comprising an operation step of adjusting the target value for glossiness by a user with an operation unit.

11. The image forming method according to claim 7, wherein the target value for glossiness is highest glossiness achievable by the image forming unit in a highest order color of the input image data.

12. The image forming method according to claim 7 further comprising:
   a setting step of setting highest glossiness achievable by the image forming unit, the target value adjusted by a user with an operation unit or highest glossiness achievable by the image forming unit in a highest order color of the input image data as the target value for glossiness, and
   a storage step of storing the set target value for glossiness in the storage unit.

13. An image forming apparatus comprising:
an image forming unit which forms an image constituted of a color toner image and a clear toner image on a sheet, the image forming unit including:
   a color image forming unit which uses a color toner to form the color toner image; and
   a clear image forming unit which uses a clear toner to form the clear toner image;
a glossiness detection unit which detects glossiness of the image formed on the sheet;
a glossiness adjustment unit which (i) generates image data for a detection-use pattern image including a color toner pattern and a clear toner pattern in such a way that a total toner adhesion amount of the color toner and the clear toner obtained by summing up a toner adhesion amount of the color toner and a toner adhesion amount of the clear toner makes a predetermined target value for glossiness so as to make the glossiness in all pixels uniform, (ii) makes the image forming unit form the detection-use pattern image by shifting a forming position of the clear toner pattern with respect to a forming position of the color toner pattern stepwise on the basis of the image data for the detection-use pattern image, (iii) makes the glossiness detection unit detect the glossiness of the detection-use pattern image, and (iv) obtains, on the basis of the forming position of the clear toner pattern when the glossiness detected by the glossiness detection unit reaches the target value for glossiness, forming position information on a forming position of the clear toner image with respect to a forming position of the color toner image; and
a control unit which (i) generates image data for the clear toner on the basis of input image data in such a way that the total toner adhesion amount of the color toner and the clear toner makes the target value for glossiness so as to make the glossiness in all pixels uniform, and (ii) when the image forming unit forms the image on the sheet on the basis of the input image data and the image data for the clear toner, controls the forming position of the clear toner image with respect to the forming position of the color toner image on the basis of the forming position information obtained by the glossiness adjustment unit.

14. The image forming apparatus according to claim 13, wherein the control unit (i) calculates, for each pixel, a summed toner adhesion amount of the color toner by summing up the toner adhesion amount of the color toner on the basis of the input image data, (ii) calculates, for each pixel, the toner adhesion amount of the clear toner by subtracting the summed toner adhesion amount of the color toner from a target total toner adhesion amount of the color toner and the clear toner corresponding to the target value for glossiness, and (iii) generates the image data for the clear toner on the basis of the toner adhesion amount of the clear toner calculated for each pixel.

15. The image forming apparatus according to claim 13, wherein the target value for glossiness is highest glossiness achievable by the image forming unit.

16. The image forming apparatus according to claim 13 further comprising an operation unit with which a user adjusts the target value for glossiness.

17. The image forming apparatus according to claim 13, wherein the target value for glossiness is highest glossiness achievable by the image forming unit in a highest order color of the input image data.

* * * * *